United States Patent
Vigano et al.

(10) Patent No.: US 11,916,631 B2
(45) Date of Patent: Feb. 27, 2024

(54) MULTI-BEAM PHASED ARRAY ANTENNA WITH DISJOINT SETS OF SUBARRAYS

(71) Applicant: Viasat, Inc., Carlsbad, CA (US)

(72) Inventors: Maria Vigano, Lausanne (CH); Nicholas Hedberg, Lausanne (CH)

(73) Assignee: Viasat, Inc., Carlsbad, CA (US)

(*) Notice: Subject to any disclaimer, the term of this patent is extended or adjusted under 35 U.S.C. 154(b) by 42 days.

(21) Appl. No.: 17/791,203

(22) PCT Filed: Jan. 8, 2021

(86) PCT No.: PCT/US2021/012843
§ 371 (c)(1),
(2) Date: Jul. 6, 2022

(87) PCT Pub. No.: WO2021/142374
PCT Pub. Date: Jul. 15, 2021

(65) Prior Publication Data
US 2023/0033070 A1    Feb. 2, 2023

Related U.S. Application Data

(60) Provisional application No. 62/959,146, filed on Jan. 9, 2020.

(51) Int. Cl.
*H04B 7/06* (2006.01)
*H01Q 3/28* (2006.01)
(Continued)

(52) U.S. Cl.
CPC ............. *H04B 7/0617* (2013.01); *H01Q 3/28* (2013.01); *H01Q 3/36* (2013.01); *H04B 7/0408* (2013.01)

(58) Field of Classification Search
CPC ...... H04B 7/0617; H04B 7/0408; H01Q 3/28; H01Q 3/36
See application file for complete search history.

(56) References Cited

U.S. PATENT DOCUMENTS 8,344,945 B2    1/2013  Craig et al.
9,374,145 B2    6/2016  Angeletti et al.
(Continued)

FOREIGN PATENT DOCUMENTS

EP    2296225 A1    3/2011
EP    2403037 A1    1/2012
(Continued)

OTHER PUBLICATIONS

Nickel et al., "Properties of Digital Beamforming with Subarrays", RADAR 2006: Proceedings of 2006 CIE International Conference on Radar; Oct. 16-19, 2006, Shanghai, China, IEEE Operations Center, Piscataway, NJ, Oct. 1, 2006, pp. 1-5, XP031073643, ISBN: 978-0-7803-9582-4 Section II.
(Continued)

*Primary Examiner* — Janice N Tieu
(74) *Attorney, Agent, or Firm* — Holland & Hart LLP

(57) ABSTRACT

A multi-beam phased array antenna system includes a beamformer responsive to control signals to convert between a plurality of subarray signals and a plurality of beam signals. The system also includes a plurality of subarrays to communicate a plurality of beams corresponding to the plurality of beam signals. Each subarray includes a plurality of radiating elements. Each subarray also includes subarray beamforming circuitry responsive to respective beam weights to adjust RF signals communicated with the radiating elements, and convert between the adjusted RF signals and one respective subarray signal. The system further includes a controller that determines two or more beams, wherein the two or more beams are the same communication type. The beamformer assigns disjoint subsets of subarrays to each of the determined two or more beams. The controller also provides the beam weights for each of the plurality of
(Continued)

subarrays and provides the control signals to the beamformer.

28 Claims, 17 Drawing Sheets

(51) Int. Cl.
*H01Q 3/36* (2006.01)
*H04B 7/0408* (2017.01)

(56) References Cited

U.S. PATENT DOCUMENTS

| | | | |
|---|---|---|---|
| 10,158,173 B2 | 12/2018 | Foo | |
| 10,355,762 B2 | 7/2019 | Kim et al. | |
| 10,560,179 B2 | 2/2020 | Gharavi et al. | |
| 11,147,069 B1* | 10/2021 | Chopra | H04B 7/0413 |
| 2007/0096982 A1 | 5/2007 | Kalian et al. | |
| 2016/0323757 A1* | 11/2016 | Braun | H04B 7/088 |
| 2017/0207547 A1 | 7/2017 | Zhai et al. | |
| 2021/0152225 A1* | 5/2021 | Zhang | H04B 7/0634 |
| 2023/0081094 A1* | 3/2023 | Huang | H04B 17/26 |
| | | | 370/329 |

FOREIGN PATENT DOCUMENTS

| | | | |
|---|---|---|---|
| EP | 3029901 A1 | 6/2016 | |
| EP | 3258537 A1 | 12/2017 | |

OTHER PUBLICATIONS

Kwak et al., "Monopulse Beam Synthesis Using a Sparse Single Layer of Weights", IEEE Transactions on Antennas and Propagation, IEEE Service Center, Piscataway, NJ, US, vol. 67, No. 4, Apr. 1, 2009, pp. 2787-2791, XP011718649, ISSN: 0018-926X, DOI: 10.1109/TAP.2019.2899850 [retrieved on Apr. 4, 2019] Section I.

* cited by examiner

MULTI-BEAM PHASED ARRAY ANTENNA WITH DISJOINT SETS OF SUBARRAYS

RELATED APPLICATIONS

The present Application is a 371 national phase filing of International Patent Application No. PCT/US2021/012843 by VIGANO et al., entitled "Multi-Beam Phased Array Antenna With Disjoint Sets of Subarrays" filed Jan. 8, 2021, which claims the benefit of priority to U.S. Provisional Application No. 62/959,146 filed on Jan. 9, 2020, entitled, "Reconfigurable Multi-Beam Phased Array Antenna", each of which is assigned to the assignee hereof, and each of which is expressly incorporated by reference herein, in its entirety.

TECHNICAL FIELD

This disclosure relates generally to antenna systems. More particularly, this disclosure relates to an antenna system with a phased array antenna having a plurality of subarrays for communicating a plurality of beams contemporaneously.

BACKGROUND

An antenna array (or array antenna) is a set of multiple radiating elements that work together as a single antenna to transmit or receive radio waves. The individual radiating elements (often referred to simply as "elements") can be connected to a receiver and/or transmitter by circuitry that applies appropriate amplitude and/or phase adjustment of signals received and/or transmitted by the radiating elements. When used for transmitting, the radio waves radiated by each individual radiating element combine and superpose with each other, adding together (interfering constructively) to enhance the power radiated in desired directions, and cancelling (interfering destructively) to reduce the power radiated in other directions. Similarly, when used for receiving, the separate received signals from the individual radiating elements are combined with the appropriate amplitude and/or phase relationship to enhance signals received from the desired directions and cancel signals from undesired directions.

An antenna array can achieve an elevated gain (directivity) with a narrower beam of radio waves, than can be achieved by a single antenna. In general, a greater number of individual radiating elements used will increase the gain and narrow the beam. Some antenna arrays (such as phased array radars) can be composed of thousands of individual antennas. Arrays can be used to achieve greater gain (which increases communication reliability), to cancel interference from specific directions, to steer the radio beam electronically to point in different directions and/or for radio direction finding.

SUMMARY

One example relates to a multi-beam phased array antenna system. The multi-beam phased array antenna system can include a beamformer responsive to control signals to convert between a plurality of subarray signals and a plurality of beam signals. The multi-beam phased array antenna system can also include a plurality of subarrays to communicate a plurality of beams corresponding to the plurality of beam signals. Each subarray of the plurality of subarrays can include a plurality of radiating elements. Each subarray can also include subarray beamforming circuitry responsive to respective beam weights to adjust RF signals communicated with the plurality of radiating elements, and convert between the adjusted RF signals and one respective subarray signal of the plurality of subarray signals, wherein the respective subarray signal corresponds to one particular beam of the plurality of beams. The multi-beam phased array antenna system can further include a controller that determines two or more beams of the plurality of beams, wherein the two or more beams are the same communication type. The controller can assign disjoint subsets of subarrays of the plurality of subarrays to each of the selected two or more beams such that each subarray of the plurality of subarrays is assigned to only the one particular beam of the plurality of beams. The controller can also provide the respective beam weights for each of the plurality of subarrays based on the assigning and provides the control signals to the beamformer based on the assigning.

DETAILED DESCRIPTION

Figure 1:
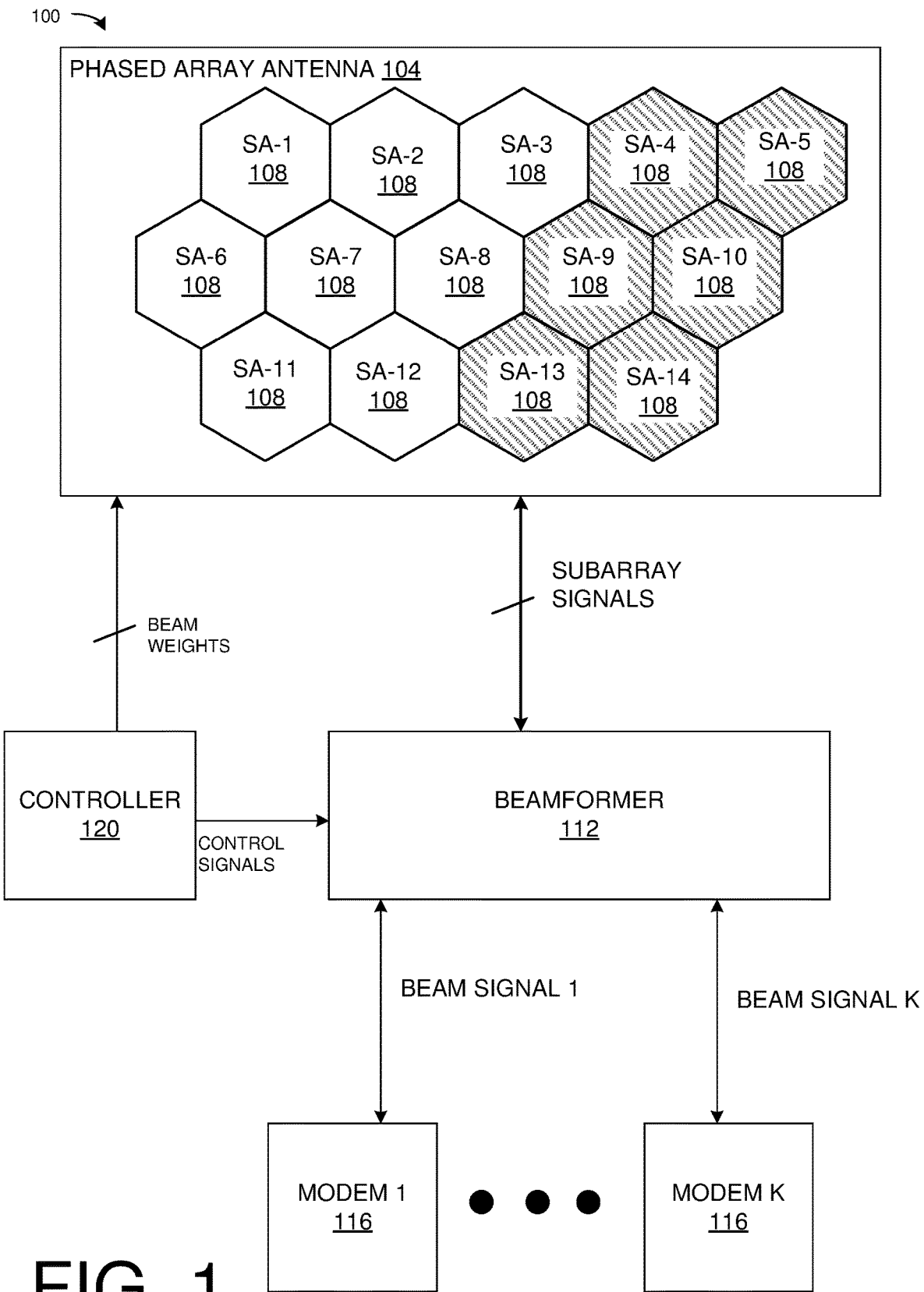
FIG. 1 illustrates a block diagram of a multi-beam phased array antenna system.

This disclosure describes a multi-beam phased array antenna system that can communicate a plurality of beams contemporaneously. The multi-beam phased array antenna system can be mounted on an entity (e.g., an aircraft or terrestrial vehicle), and employed to communicate with an external entity or multiple external entities (e.g., one or more satellites). Each of the plurality of beams can represent a plurality of radio frequency (RF) signals constructively and/or destructively interfering to provide desired characteristics. The multi-beam phased array antenna system includes a phased array antenna that can be formed of a plurality of subarrays. In some examples, the subarrays are arranged as tiles. Each of the plurality of subarrays includes a plurality of radiating elements for communicating the plurality of beams with another entity through free space.

The multi-beam phased array antenna system can include a beamformer that converts between a plurality of subarray signals and a plurality of beam signals, wherein each of the beam signals corresponds to one of the plurality of beams. Moreover, each of the plurality of subarray signals is provided to one, and only one of the subarrays of the phased array antenna. The beamformer can be composed of digital logic, analog circuitry or a combination thereof.

Each of the plurality of subarrays can include subarray beamforming circuitry that adjust RF signals communicated with the plurality of respective radiating elements based on beam weights. Moreover, the subarray beamforming circuitry can be configured to convert between the adjusted RF signals and one respective subarray signal of the plurality of subarray signals. In some examples, the beamforming circuitry can include a subarray beamforming network (BFN) coupled to the beamformer and a plurality of radio frequency integrated circuit (RFIC) chips coupled to respective radiating elements.

The multi-beam phased array antenna system can include a controller that dynamically controls the operations of each of the plurality of subarrays and the beamformer. More particularly, the controller can be configured/programmed to determine two or more beams from the plurality of beams. The determined two or more beams include two beams of the same communication type. As used herein, "communication type" refers to a direction of communication, such as transmit or receive, such that the determined two or more beams include at least two receive beams or at least two transmit beams. Two beams of the same communication type are different if at least one of their frequency, polarization, and pointing direction are different. In response to the determination of the two or more beams, the controller assigns disjoint subsets of subarrays of the plurality of subarrays to each of the determined two or more beams. In this manner, each subarray of the plurality of subarrays is assigned to one, and only one particular beam of the plurality of beams. The controller can provide the respective beam weights for each of the plurality of subarrays, and provide the control signals to the beamformer based on the assigning.

The controller can be configured to change the determination of the two or more beams over time. For instance, as the entity to which the multi-beam phased array antenna system is mounted moves, and/or the entity (or entities) the multi-beam phased array antenna system communicated with moves, the controller can dynamically determine beams for transmitting and/or receiving data from different satellites (or other entities), and re-assign the disjoint subarrays of the phased array antenna. In this manner, the multi-beam phased array antenna system can be employed to implement make-before-break communications with two satellites contemporaneously. For instance, consider a situation where the multi-beam phased array antenna system is mounted on an entity, and the multi-beam phased array antenna system can be employed to provide bi-directional communication with a first satellite using the phased array antenna. As communications with the first satellite begin to degrade (e.g., due to a change in position of the entity), the multi-beam phased array antenna system can establish bi-directional communication with a second satellite using the same phased array antenna before communication with the first satellite is lost.

FIG. 1 illustrates an example of a multi-beam phased array antenna system 100. The multi-beam phased array antenna system 100 communicates a plurality of beams contemporaneously. As used herein, the term "communicate" (and its derivatives) in reference to signals refers to the transmission and/or the reception of signals, neither requiring both transmission and reception nor excluding either transmission or reception. The multi-beam phased array antenna system 100 includes a phased array antenna 104 formed with a J number of subarrays 108, where J is an integer greater than one. In some examples, the phased array antenna 104 can represent multiple antennas (e.g., a transmit antenna and a receive antenna). In other examples, the phased array antenna 104 represents a single antenna.

In the present example, there are 14 subarrays 108, labeled SA-1 . . . SA-14. In other examples, there could be more or fewer subarrays 108. Each subarray 108 includes a plurality of radiating elements that communicate radio frequency (RF) signals into free space. Each of the J number of subarrays 108 includes subarray beamforming circuitry that converts between the RF signals and a subarray signal. More particularly, the subarray beamforming circuitry can include signal paths for combining and/or dividing the RF signals for the conversion. Additionally, the subarray beamforming circuitry of each of the J number of subarrays 108 can include circuit components, such as radio frequency integrated circuit (RFIC) chips that can amplify and/or phase shift the RF signals based on beam weights.

In some examples, each of the J number of subarrays 108 can have the same shape (e.g., has a top surface with the same shape). Examples of shape a can include a hexagon (as shown in FIG. 1), a square, a rhombus, a triangle, etc. In other examples, the phased array antenna 104 may include different sets of subarrays 108 that have different shapes, such as a first set of one or more subarrays 108 having a first shape, a second set of one or more subarrays 108 having a second shape, etc. In yet other examples, each of the J number of subarrays 108 can have a different shape. In some examples, the subarrays 108 may be arranged in a regular lattice (e.g., triangular, square, etc.). The subarrays 108 in such an arranged lattice may for example a be arranged edge-to-edge (e.g., form a contiguous aperture). In other examples, the subarrays 108 may be arranged in an irregular pattern.

The phased array antenna 104 is configured such that disjoint subsets of the subarrays 108 are assigned to communicate a particular beam of a plurality of beams, and each of the plurality of beams can be communicated with another entity such as a satellite or a terrestrial station. As used herein, "disjoint subsets" refers to subsets of a set (e.g., the set of 14 subarrays) where each individual disjoint subsets has no members in common with another disjoint subset. For instance, if the first-seventh subarrays 108 (SA-1 . . . SA-7) are assigned to a first beam, and the eight to fourteenth subarrays 108 (SA-8 . . . SA-14) are assigned to a second beam, the first-seventh subarrays 108 (SA-1 . . . SA-7) are a first disjoint subset of the subarrays 108 and the eight to fourteenth subarrays 108 (SA-8 . . . SA-14) are a second disjoint subset of the subarrays. In this situation, the first beam and the second beam can be in the same or different directions, and can be communicated simultaneously. In this manner, the phased array antenna 104 can be employed to transmit and receive different beams transmitted to and from the same entity in the same direction or the phased array antenna 104 is employable to communicate with two different entities at the same time.

Each of the J number of subarrays 108 communicates a subarray signal with a beamformer 112, such that there are J number of subarray signals. The beamformer 112 can be implemented as a plurality of beamforming networks (BFNs) or as digital logic (e.g., a field programmable gate array (FPGA)). In either situation, the beamformer 112 can convert between the J number of subarray signals and K number of beam signals, where K is an integer greater than or equal to one. Each beam signal corresponds to one and only one (exactly one) beam.

Each of the K number of beam signals can be a transmit or a receive signal that includes embedded data. Each of the K number of beam signals can be communicated with K number of modems 116. The K number of modems 116 can be employed to encode or decode data on a corresponding beam signal of the K number of beam signals.

The multi-beam phased array antenna system 100 can include a controller 120 that can control operations of the beamformer 112 and the J number of subarrays 108 of the phased array antenna 104. In some examples, the controller 120 can be implemented, for example as one or more processor cores with embedded instructions. In other examples, the controller 120 can be implemented as a computing platform, such as a system with a non-transitory machine readable media (e.g., memory) that stores machine readable instructions and one or more processor cores that executes the machine readable instructions.

As noted, the multi-beam phased array antenna system 100 communicates a plurality of beams contemporaneously. Each beam communicated by the phased array antenna system 100 operates as either a transmit beam or a receive beam. In an example where a given beam is a given receive beam, energy is received at radiating elements of the subarrays 108 and converted into RF signals. As described in more detail below, a subset of one or more subarrays 108 is assigned to the given receive beam by the controller 120. The subarray beamforming circuitry of each subarray 108 of the subset adjusts and combines its RF signals in response to the beam weights from the controller 120 to form a respective subarray signal associated with the given receive beam. The subarray signal from each subarray 108 of the subset are then provided to the beamformer 112. Responsive to the control signals from the controller 120, the beamformer 112 adjusts and combines the subarray signals from the subset to form a given receive beam signal (e.g., beam signal 1) corresponding to the given receive beam. One or more other subsets of subarrays are similarly assigned to each of the other receive beam(s) by the controller 120 and provided beam weights to form the respective subarray signals associated with the other assigned receive beam(s). The beamformer 112 similarly adjusts and combines the respective set of one or more subarray signals that are associated with each of the other respective receive beams to form the other receive beam signals. Each of the K number of receive beam signals are then provided to a given one of the K number of modems 116. Responsive to the beam signal, the given modem 116 decodes data on the beam signal for employment at externals systems.

Conversely, in an example where the given beam is a given transmit beam, a given modem 116 of the K number of modems 116 receives data for transmission from an external system. Responsive to the data, the given modem 116 encodes the data on a given beam signal of the K number of beam signals, which given beam signal is provided to the beamformer 112. Responsive to the control signals, the beamformer 112 converts the given beam signal into a given set of one or more subarray signals that are associated with the given transmit beam. The beamformer 112 then provides each respective subarray signal of the given set to a respective corresponding subarray 108 of a subset of the subarrays that have been determined for the given transmit beam by the controller 120. Responsive to the beam weights, the subarray beamforming circuitry of each subarray 108 in the subset converts a respective subarray signal into a set of RF signals. Each of the RF signals are propagated into free space as the given beam by radiating elements of each respective subarray 108 in the subset of subarrays 108, thereby forming the given transmit beam. The multi-beam phased array antenna system 100 similarly forms the other transmit beams (if any).

The beamforming circuitry of the J number of subarrays 108 can be implemented as receive beamforming circuitry and/or transmit beamforming circuitry. The receive beamforming circuitry is assigned to receive beams (such as the given receive beam described above) and the transmit beamforming circuitry is assigned to transmit beams (such as the given transmit beam described above). Each instance of the beamforming circuitry includes active components (e.g., phase shifters and/or amplifiers) configured to adjust a signal of a particular type in one direction. More particularly, receive beamforming circuitry is configured to adjust and combine RF signals to form a subarray signal associated with a receive beam that is then provided to the beamformer 112. Conversely, transmit beamforming circuitry is configured to obtain a subarray signal associated with a transmit beam from the beamformer, and divide and adjust the subarray signal into RF signals for a transmission into free space.

The controller 120 can provide control signals to the beamformer 112 that cause the beamformer 112 to assign the individual subarrays 108 to particular beams. Stated differently, the beamformer 112, responsive to the control signals provided from the controller 120, assigns individual subarrays 108 to particular beams. Additionally, the controller 120 can provide the beam weights to the subarray beamforming circuitry of the J number of subarrays 108. Responsive to the beam weights, the subarray beamforming circuitry of each of the J number of subarrays 108 adjust respective RF signals for communication on respective radiating elements.

The beam weights provided from the controller 120 can be implemented as control signals that controls operations of each respective one of the J number of subarrays 108. The beam weights can control operations of phase shifters, amplifiers, filters, switches, etc. of the subarray beamforming circuitry.

The beam weights provided to the subarrays 108 and the control signals provided from the controller 120 to the beamformer 112 define the beams that are to be communicated (transmitted or received) by the radiating elements of the subarrays 108 via constructive and destructive interference that focuses energy communicated in particular directions. More particularly, the beam weights applied by each of the subarrays 108 adjust (e.g., amplify and/or phase shift) the RF signals communicated by each respective subarray 108, along with the control signals used by the beamformer to adjust the subarray signals associated with each beam, enable steering of the beams to focus the energy communicated in the particular direction.

In operation, the controller 120 can determine two or more beams from the plurality of beams for communication. The two or more beams can be determined for example, based on a location of the multi-beam phased array antenna system 100 and a location of an external entity communicating wirelessly with the multi-beam phased array antenna system 100. Determination of the two or more beams includes operations executed by the controller 120 to determine how many beams to form, and the desired characteristics (e.g., beamwidth, gain, sidelobe levels, cross-polarization etc.) of each beam of the two or more beams. More particularly, the controller 120 can be configured to weigh a plurality of factors to determine the number and the characteristics of beams in the two or more beams. These factors can include, but are not limited to, identification of the entities (e.g., satellites) to be communicated with, the directionality of the communication with each entity (e.g., whether communication is unidirectional (transmit or receive) or bidirectional (transmit and receive)), the location of each entity relative to the orientation of the phased array antenna 104, and the desired link performance between the phased array antenna 104, the entities and/or possible interference levels in other directions. Moreover, in some examples, only a subset of these factors can be considered by the controller 120 to determine the two or more beams. In other examples, a superset of these factors can be considered by the controller 120 to determine the two or more beams.

The two or more beams of the plurality of beams determined by the controller 120 includes at least two beams of the same communication type. That is, the two or more beams includes at least two transmit beams or at least two receive beams. The two beams of the same communication type differ in at least one of their frequency, polarization, and pointing direction.

In some examples, the controller 120 can determine a first receive beam for receiving data from a first entity (e.g., a first satellite) and a second receive beam for receiving data from a second entity (e.g., a second satellite) contemporaneously, such that the multi-beam phased array antenna system 100 has two receive beams. Additionally or alternatively, in some examples, the controller 120 can determine a first transmit beam for transmitting data to the first entity and a second transmit beam for transmitting data to the second entity. In such a situation, the multi-beam phased array antenna system 100 can contemporaneously execute bi-directional communication with two different external entities, such as two different satellites. For instance, one satellite can be a low orbit satellite and another satellite could be a geosynchronous orbit satellite. Alternatively, both such satellites could be low orbit satellites or both satellites could be geosynchronous orbit satellites. In either such situation, the controller 120 can determine a first beam for transmitting data to the first satellite, a second beam for receiving data from the first satellite, a third beam for transmitting data to the second satellite and a fourth beam for receiving data from the second satellite contemporaneously. In this example, the first and second beams can have the same direction, and the third and fourth beams can also have the same direction. This allows the multi-beam phased array antenna system 100 to implement make-before-break communications with the two satellites. More particularly, the controller 120 can determine the first and second beams for communication with the first satellite and subsequently determine the third and fourth beams for communication with the second satellite before communications with the first satellite is lost.

In other examples, the multi-beam phased array antenna system 100 can communicate with three or more entities contemporaneously. Additionally, in other examples, the controller 120 can be configured to communicate with a particular entity using only one beam (e.g., a transmit beam or a receive beam), such that the multi-beam phased array antenna system 100 only transmits or receives data with the particular entity to provide unidirectional communication.

In response to determining the two or more beams from the plurality of beams, the controller 120 can assign disjoint subsets of the J number of subarrays of the phased array antenna 104. For instance, as illustrated, the controller 120 can assign subarrays 1-3, 6-8 and 11 to a first beam as a first disjoint subset of subarrays 108 and subarrays 4-5, 9-10 and 13-14 to a second beam as a second disjoint subset of subarrays 108. In the example illustrated, the second disjoint subset of subarrays 108 has been shaded for illustrative purposes.

Assignment of the disjoint subsets of the subarrays 108 can be based, for example on characteristics of the beam being communicated with the external entity. Such characteristics of a given beam can include, for example, an aperture size and shape for the given beam. For instance, certain subarrays 108 can be determined to account for beam width and/or signal strength needed to communicate with the external entity.

The controller 120 can calculate the beam weights needed for each individual subarray 108 based on the assigning. The beam weights can characterize a phase shift and/or an amplification of an RF signal needed for the characteristics (e.g., the aperture size and shape) of a particular beam. In the present example, different subarrays 108 within the same disjoint subset can have different beam weights. Additionally, different subarrays 108 in different disjoint subsets can also have different beam weights. That is, the beam weights of each individual subarray 108 can be tuned for the particular beam to which the respective subarray 108 is assigned. The controller 120 can provide the beam weights to each of the J number of subarrays 108 in the phased array antenna 104. The respective subarray beamforming circuitry of each subarray 108 can adjust RF signals communicated with the respective radiating elements in response to the beam weights provided from the controller 120. Stated differently, responsive to the beam weights, the respective subarray beamforming circuitry of each subarray can adjust the RF signals communicated with the radiating elements accordingly.

The assignment of the subarrays 108 to particular beams and/or the beam weights can be changed dynamically by the controller 120. For example, the controller 120 can re-assign some (or all) of the subarray 108 to a new beam and/or re-calculate the beam weights to compensate for a change in location of an entity that houses the multi-beam phased array antenna system 100 and/or a location of an external entity communicating with the multi-beam phased array antenna system 100 (e.g., a satellite) or to comply with regulatory requirements.

Additionally, in response to the assigning (or the re-assigning), the controller 120 provides the control signals to the beamformer 112. Responsive to the control signals, the beamformer 112 couples each subarray signal to one corresponding beam signal of the K number of beam signals, such that each subarray signal is a constituent component of one and only one beam signal. For instance in a situation where there are two beam signals, namely a first beam signal and a second beam signal, subarray signals associated with subarrays 108 of the first disjoint subset can be coupled to a signal path for the first beam signal. Thus, the beamformer 112 can convert between the subarray signals associated with subarrays 108 of the first disjoint subset and the first beam signal. Similarly, in this situation, the beamformer 112 couples subarray signals associated with the second disjoint subset to signal paths associated with the second beamforming signal. Thus, the beamformer 112 can convert between the subarray signals associated with subarrays 108 of the second disjoint subset and the second beam signal.

As the location of the multi-beam phased array antenna system 100 changes and/or a location of the external entities change, the controller 120 can determine different beams of the K number of beams, and dynamically assigned the disjoint subsets of the subarrays 108 to the determined beams. In this manner, the same phased array antenna 104 formed of the J number of subarrays 108 can be employed to communicate different beams contemporaneously. Accordingly, the multi-beam phased array antenna system 100 can establish communication with one or more entities through the determined beams.

Conventional multi-beam antennas may include circuitry that allows all radiating elements to contribute to each beam. However, such a conventional multi-beam antenna is highly complex because it requires a large number of circuit components, and therefore increases cost accordingly. In contrast, each of the J number of subarrays 108 includes subarray beamforming circuitry capable of being used to contribute to one and only one beam of a particular communication type (i.e., one and only one transmit beam and/or one and only one receive beam). That is, each of the J number of subarrays 108 includes a single instance of beamforming subarray circuitry of a particular communication type (e.g., implemented as a combiner/divider network) that is a 1:G port device (where "1" corresponds to the subarray signal, and G is the number of RF signals processed by the beamforming subarray circuitry), and there is one set of G adjustment circuits, which results in the subarray radiating elements contributing to one beam of the particular communication type. In embodiments in which a given subarray 108 includes radiating elements used to both transmit and receive, the beamforming circuitry of the given subarray 108 can include receive beamforming circuitry (capable of being used to contribute to one and only one receive beam) and transmit beamforming circuitry (capable of being used to contribute to one and only one transmit beam). While the multi-phased array antenna 100 may have lower performance metrics in some applications as compared to a conventional multi-beam antenna, the multi-phased array antenna 100 has a reduced cost and complexity as compared to conventional multi-beam antennas. More particularly, the multi-phased array antenna 100 of FIG. 1 sacrifices performance by only using each of the J number of subarrays 108 for one beam, in exchange for a significant savings in cost/complexity by having many less circuit elements.

Figure 2:
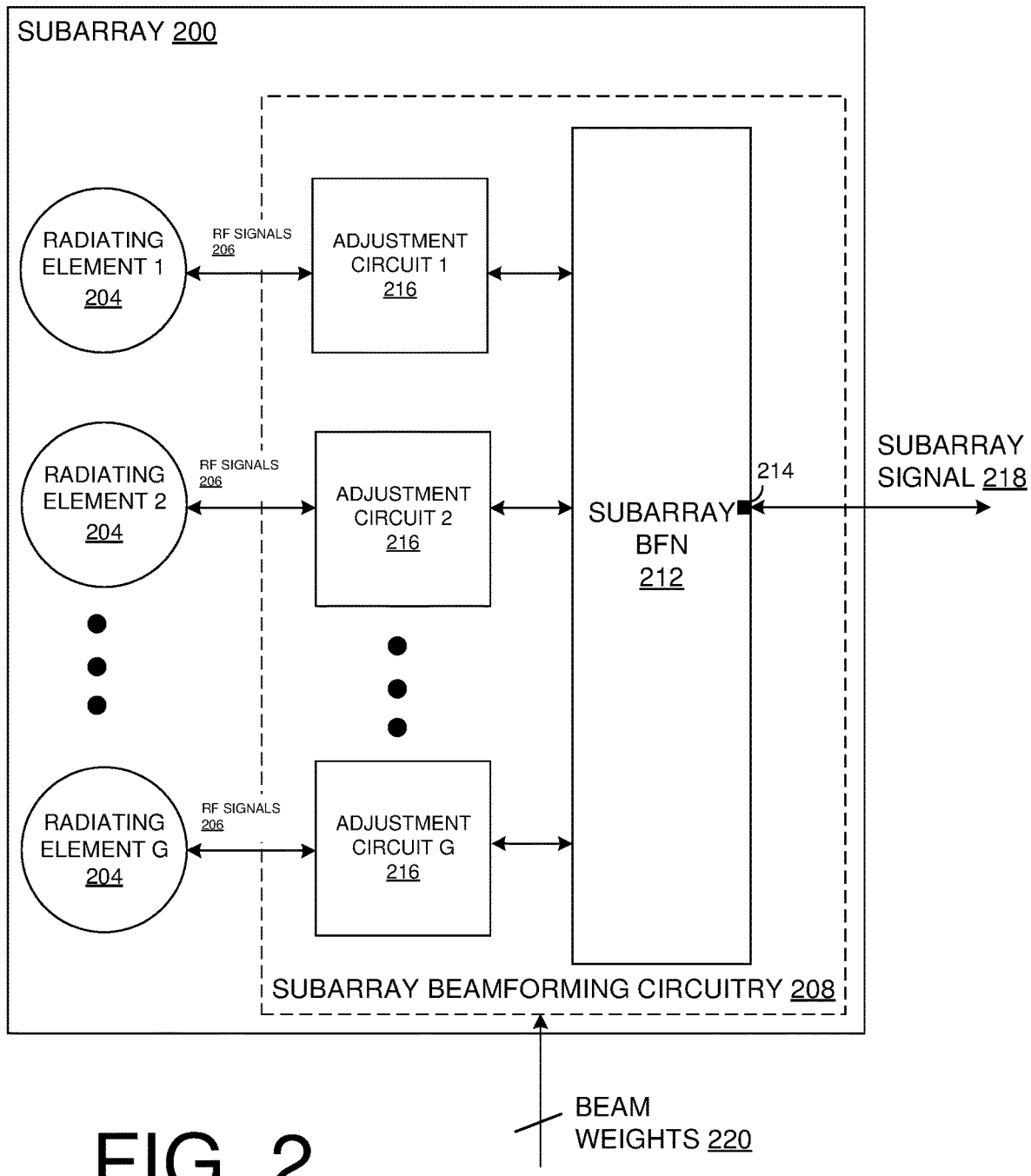
FIG. 2 illustrates a block diagram of a subarray for a phased array antenna system.

FIG. 2 illustrates a block diagram of an example of a subarray 200 that can be employed in a phased array antenna. The subarray 200 is employable to implement one of the J number of subarrays 108 of the phased array antenna 104 of FIG. 1.

The subarray 200 includes G number of radiating elements 204, where G is an integer greater than one. Each of the G number of radiating elements 204 can be implemented for example as a patch antenna, a slot antenna or a combination thereof. Each of the G number of radiating elements 204 can be employed to communicate an RF signal 206. In examples where the subarray 200 is assigned to a transmission beam, each of the G number of radiating elements 204 transmits an RF signal 206 into free space. RF signals 206 communicated by the G number of radiating elements 204 can be horizontally polarized, vertically polarized, circularly polarized, etc. Examples where the subarray 200 is assigned to a receive beam, each of the G number of radiating elements 204 receives an RF signal 206 from free space.

Each of the G number of radiating elements 204 communicates with subarray beamforming circuitry 208. The subarray beamforming circuitry 208 can include beamforming circuits, phase shifters, amplifiers, combiners/divider circuits, etc. to convert between G number of RF signals 206 and a subarray signal 218. The subarray signal 218 can be communicated with a beamformer, such as the beamformer 112 of FIG. 1. The subarray beamforming circuitry 208 can include a port 214 for the subarray signal 218. In the examples illustrated in which the subarray 200 is used to contribute to a given beam of one particular communication type (e.g., a transmit beam or a receive beam), the subarray 200 includes one and only one port for the subarray signal 218, such that the subarray beamforming circuitry communicates one and only one subarray signal 218 at a time associated with the given beam. In examples in which the subarray 200 is used to contribute to one receive beam and one transmit beam, the subarray 200 includes two ports—one and only one port for a receive subarray signal associated with the receive beam, and one and only one port for a transmit subarray signal associated with transmit beam (see, for example FIG. 16).

In the example illustrated, the subarray beamforming circuitry 208 includes a subarray BFN 212. The subarray BFN 212 can include the subarray signal port 214 of the subarray beamforming circuitry 208. The subarray beamforming circuitry 208 also includes G number of adjustment circuits 216 that communicate respective RF signals 206 with a corresponding radiating element 204. The G number adjustment circuits 216 can each be implemented as discrete circuit components, an IC chip (or multiple IC chips), such as a radio frequency integrated circuit (RFIC) chip or a combination thereof. For instance, in some examples, each adjustment circuit 216 can be implemented with an RFIC chip, such that there can be a one-to-one correspondence of RFIC chips and radiant elements 204. In other examples, there can be other ratios of RFIC chips to radiating elements 204, including examples where multiple radiating elements 204 are connected to a single RFIC chip. In the example illustrated, each adjustment circuit 216 communicates RF signals 206 to a respective radiating element 204. In such a situation, one RF signal 206 communicated with the respective radiating element 204 can be vertically polarized, and another signal communicated with the respective radiating element 204 can be horizontally polarized. In other examples, each adjustment circuit 216 can communicate a single RF signal 216 with the respective radiating element 204.

Additionally, the subarray BFN 212 communicates subarray component signals 218 with each of the adjustment circuits 216. The subarray BFN 212 is configured to convert between the subarray signal 218 and RF signals 206. Each of the G number of adjustment circuits 216 adjusts (e.g., amplifies and/or phase shifts) a respective RF signal 206 communicated with a respective radiating element 204. Thus, in concert, the subarray BFN 212 and the G number of adjustment circuits 216 convert between the subarray signal 218 and the RF signals 206 communicated with the G number of radiating elements 204.

The subarray 200 can contribute to a portion of a transmit beam and/or contribute to a portion of a receive beam. In an example where the subarray 200 contributes to a portion of a receive beam, energy is received at the G number of radiating elements 204 and converted into the RF signals 206. The subarray beamforming circuitry 208 adjusts and combines the RF signals 206 and forms the subarray signal 218 that is provided to a beamformer. More particularly, responsive to beam weights, each of the G number of adjustment circuits 216 adjusts the RF signals 206 and provides the corresponding adjusted RF signals 206 to the subarray BFN 212. Responsive to the adjusted RF signals 206, the subarray BFN 212 combines the adjusted RF signals 206 to provide the subarray signal 218 through the port 214.

In an example where the subarray 200 contributes to a portion of a transmit beam, the subarray beamforming circuitry 208 receives a subarray signal 218 associated with the transmit beam from the beamformer. Responsive to the subarray signal, the beamforming circuitry 208 converts the subarray signal into G number of RF signals 204. More particularly, the subarray BFN 212 receives the subarray signal 218 at the port 214 that is provided from the beamformer. The subarray BFN 212 converts the subarray signal 218 into G number of RF signals 206 that are provided to respective adjustment circuits 216. The adjustment circuits 216 adjust the respective RF signals 206 in response to the beam weights, and provide the respective RF signals 206 to corresponding radiating elements 204, wherein each of the RF signals 206 are propagated into free space to contribute to the transmit beam.

The beamforming circuitry 208 can be implemented as receive beamforming circuitry and/or transmit beamforming circuitry. In examples where the beamforming circuitry 208 is implemented as receive beamforming circuitry, the beamforming circuitry can be assigned to a receive beam (such as the receive beam described above). Conversely, in examples where the beamforming circuitry 208 is implemented as transmit beamforming circuitry, the beamforming circuitry 208 can be assigned to a transmit beam (such as the transmit beam described above). The G number of adjustment circuits 216 of the beamforming circuitry 208 includes active components (e.g., phase shifters and/or amplifiers) configured to adjust the RF signals 206 in one direction. More particularly, receive beamforming circuitry 208 is configured to adjust and combine RF signals 206 to form a subarray signal 218 associated with a received beam. Conversely, transmit beamforming circuitry is configured to divide and adjust a subarray signal 218 associated with a transmit beam into RF signals 216 for transmission into free space to contribute to a transmit beam.

The subarray beamforming circuitry 208 can adjust the RF signals 206 based on beam weights 220 provided from a controller, such as the controller 120 of FIG. 1. More particularly, the beam weights 220 can be provided to each of the G number of adjustment circuits 216. Each of the G number of adjustment circuits 216 can include active components and/or other circuitry that can adjust the RF signals 206. For example, each adjustment circuit 216 can include an amplifier and/or a phase shifter that are employable to respectively amplify and/or phase shift an RF signal 206 communicated with a respective radiating element 204. The amount of amplification and/or phase shift is controlled by the beam weights 220. Stated differently, responsive to the beam weights 220, each adjustment circuit 216 amplifies and/or phase shifts RF signals 206 communicated with a respective radiating element 204.

In some examples, the subarray BFN 212 is a passive 1:G circuit that includes combiners/dividers to one of combine or divide the subarray signal 218 into the RF signals 206 for adjustment by the G number of adjustment circuits 216. More particularly, in one example, the combiners/dividers can be employed to combine the RF signals 206 provided from the adjustment circuits 216 into the subarray signal 218. In other examples, the combiners/dividers of the subarray BFN 212 can divide the subarray signal 218 into the RF signals 206 that are provided to the adjustment circuits 216. Although the subarray 200 is illustrated as the adjustment circuits 216 being separate from the subarray BFN 212, in some examples, the adjustment circuits 216 can be integrated with the subarray BFN 212.

As illustrated, the beam weights 220 provided from the controller can be determined to individually tune the RF signals 206 communicated by the G number of radiating elements 204. That is, the subarray beamforming circuitry 208, responsive to the beam weights 220 adjusts the RF signals 206 accordingly such that the subarray 200 can operate in concert with other subarrays (e.g. other subarrays in a disjoint subset determined for a particular beam) to communicate a beam in free space.

As illustrated, the subarray 200 (which is representative of any of the J number of subarrays 108 of FIG. 1) has exactly one instance of beam forming circuitry 208 of a particular communication type. Moreover, the subarray beamforming circuitry 208 is a 1:G port device. More particularly, the port 214 corresponds to the "1" and G corresponds to the G number of RF signals 206 communicated by the G number of adjustment circuits 216. Furthermore, as illustrated, the subarray beamforming circuitry 208 includes exactly one set of the G number of adjustment circuits 216, such that components of the subarray 208 contribute to one, and only one beam of a particular communication type. In contrast, a conventional multi-beam phased array antenna using each radiating element for each of M beams has 2*M 1:X port devices (where X is the total number of radiating elements in the array) and a total of M*X adjustment circuits (a set of X adjustment circuits for each beam). While the use of every radiating element in each beam may provide good performance since the entire antenna aperture is used, conventional multi-beam antennas also have higher costs and complexity than the multi-beam phased array antenna 100 of FIG. 1 (that employs J number of the subarrays 200) due to the additional circuit elements needed. Consequently, the multi-phased array antenna 100 of FIG. 1 using J number of the subarrays 200 may have lower performance metrics in some applications as compared to a conventional multi-beam antenna, but the multi-phased array antenna 100 of FIG. 1 has a reduced cost and complexity. More particularly, by providing the subarray 200 as a 1:G port device and G adjustment circuits 216 that contributes to one, and only one beam, the multi-phased array antenna 100 of FIG. 1 that employs J number of the subarrays 200 can achieve a significant savings in cost/complexity (by having many less circuit elements) as compared to conventional phased array antennas.

Figure 3:
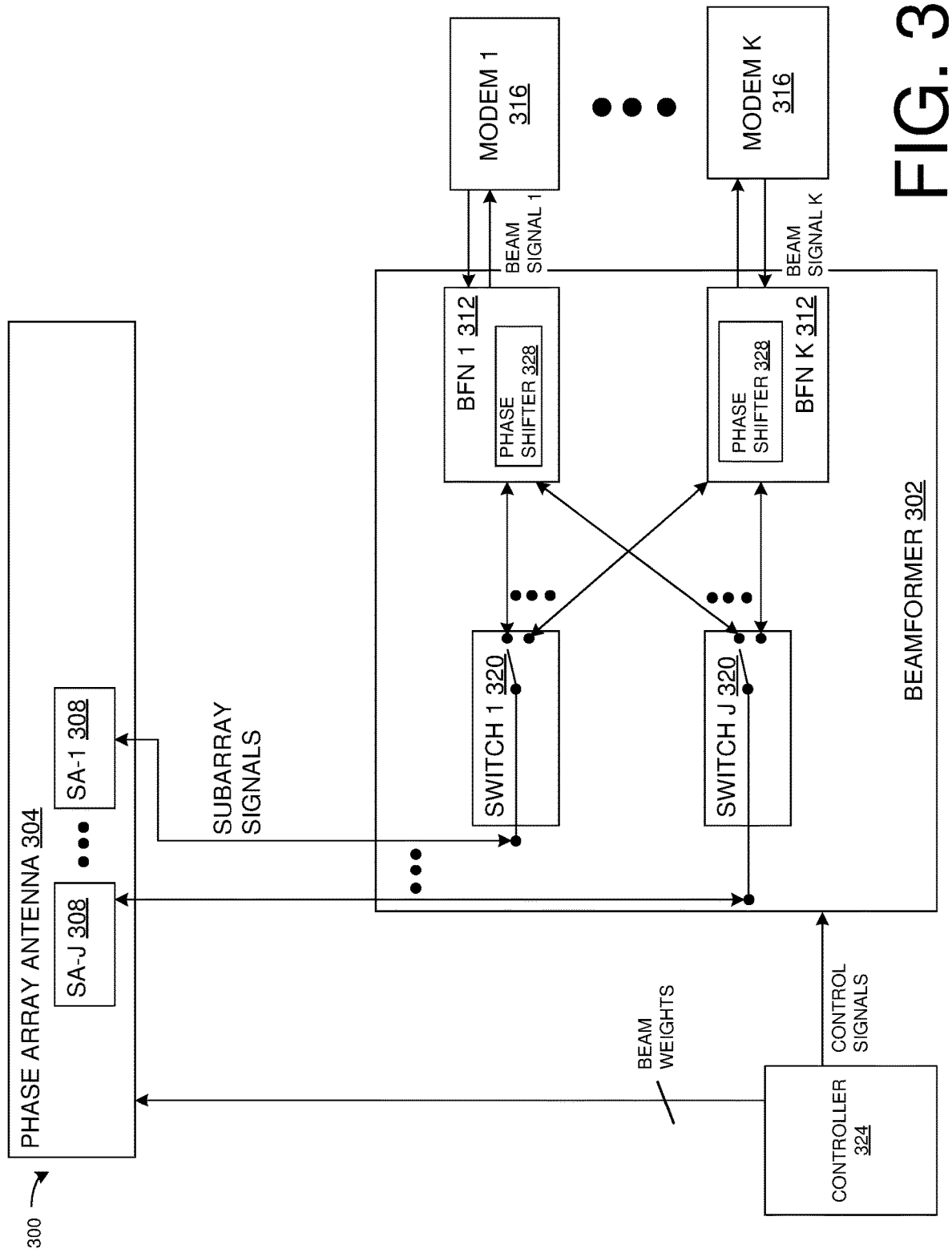
FIG. 3 illustrates a block diagram of a multi-beam phased array antenna system with a beamformer that includes a plurality of beam forming networks (BFNs).

FIG. 3 illustrates an example of a multi-beam phased array antenna system 300 that includes a beamformer 302 implemented with analog circuitry. The multi-beam phased array antenna system 300 can be employed to implement the multi-beam phased array antenna system 100 of FIG. 1. Thus, the multi-beam phased array antenna system 300 communicates a plurality of beams contemporaneously. The beamformer 302 can be employable to implement the beamformer 112 of FIG. 1. Moreover, the multi-beam phased array antenna system 300 includes a phased array antenna 304 that can be employed to implement the phased array antenna 104 of FIG. 1. Thus, the phased array antenna 304 can be formed with J number of subarrays 308, such as the J number of subarrays 108 of FIG. 1. Moreover, each of the J number of subarrays 308 of the phased array antenna 304 can be implemented with an instance of the subarray 200 of FIG. 2. In some examples, the phased array antenna 304 can represent multiple antennas (e.g., a transmit antenna and a receive antenna). More particularly, in some examples, the phased array antenna 304 can represent multiple contiguous partitions of the J number of subarrays 308 to form individual antennas. Such contiguous partitions of the J number of subarrays 308 forming the individual antennas can be spaced apart from each other. Additionally, these contiguous partitions of the J number of subarrays 308 are employable to operate independently (e.g., one phased array antenna for receive beams and another phased array antenna for transmit beams). In other examples, the phased array antenna 304 represents a single antenna. In such a situation, the J number of subarrays 308 can be arranged in a contiguous pattern and different subarrays 308 of the J number of subarrays 308 can be assigned to different beams.

Each of the J number of subarrays 308 includes subarray beamforming circuitry that converts between the RF signals and a subarray signal, such that the phased array antenna 304 communicates J number of subarray signals with the beamformer 302. As noted, the beamformer 302 is implemented with analog circuitry. More particularly, the beamformer 302 can include K number of BFNs 312. Each of the K number of BFNs 312 can convert between a subset of the J number of subarray signals and a particular one, and only one, of the K number of beam signals. Each beam signal corresponds to one and only one beam.

Each of the K number of beam signals can be either a transmit or a receive signal that includes embedded data at a given time during operation of the multi-beam phased array antenna system 300. More particularly, the multi-beam phased array antenna system 300 can be configured to switch assignment of the beam signals between the transmit or receive signals. Each of the K number of beam signals can be communicated with a modem 116 of K number of modems 316. The K number of modems 316 can be employed to encode or decode data on a corresponding beam signal of the K number of beam signals.

The beamformer 302 can include J number of switches 320. Each of the J number of switches 320 can be coupled to one, and only one of the J number of subarrays 308. Each of the J number of switches 320 can be implemented as a single pole multi-throw switch that is configured to electrically couple a respective one of the J number of subarrays 308 with a determined one of the K number of BFNs 312. That is, at any given point in time each of the J number of switches 320 can be coupled to the respective subarray 308 and to any one of the K number of BFNs 312. Each of the J number of switches 320 can be implemented as a transistor based solid-state switch or as a electromechanical switch.

The multi-beam phased array antenna system 300 can include a controller 324 that can control operations of the beamformer 302 and the J number of subarrays 308 of the phased array antenna 304. In some examples, the controller 324 can be employed to implement the controller 120 of FIG. 1. The controller 324 can provide control signals to the beamformer that cause the beamformer 302 to assign the individual subarrays 308 to particular beams. Additionally, the controller 324 can provide the beam weights to the subarray beamforming circuitry of the J number of subarrays 308. Responsive to the beam weights, the subarray beamforming circuitry of each of the J number of subarrays 108 can adjust respective RF signals for communication on respective radiating elements.

Additionally, the control signals provided by the controller 324 can control a state of the J number of switches 320. Stated differently, the state of each of the J number of switches 320 is responsive to the control signals provided from the controller 324. Accordingly, in response to the control signals, each switch 320 of the J number of switches couples a respective subarray 308 of the J number of subarrays 308 with a determined BFN 312 of the K number of BFNs 312. In this manner, each of the J number of subarrays 308 is electrically coupled to one, and only one BFN 312.

In operation, the controller 324 can determine two or more beams from the plurality of beams. The determined two or more beams include two beams of the same communication type (e.g., at least two receive beams or at least two transmit beams). The two or more beams can be determined for example, based on a location of the multi-beam phased array antenna system 300 and a location of an external entity communicating wirelessly with the multi-beam phased array antenna system 300. Additionally or alternatively, in some examples, the controller 120 can determine four (4) beams from the plurality of beams to establish bi-directional communication with two different entities (e.g., two different satellites). This allows the multi-beam phased array antenna system 300 to implement make-before-break communications with the two satellites.

In other examples, the multi-beam phased array antenna system 300 can communicate with three or more satellites contemporaneously. Additionally, in other examples, the controller 324 can be configured to communicate with a particular satellite using only one beam, such that the multi-beam phased array antenna system 300 only transmits or receives data with the particular satellite (e.g., unidirectional communication).

In response to determining the two or more beams from the plurality of beams, the controller 324 can assign disjoint subsets of the J number of subarrays 308 of the phased array antenna 304 to the determined two or more beams. Assignment of the disjoint subsets of the subarrays 308 can be based, for example on characteristics (e.g., aperture size and shape) of the beam being communicated with the external entity.

The controller 324 can calculate the beam weights needed for each individual subarray 308 based on the assigning. The beam weights can characterize a phase shift and/or an amplification of an RF signal needed for the characteristics (e.g., the aperture size and shape) of a particular beam. The beam weights applied by each of the subarrays 308 to adjust (e.g., amplify and/or phase shift) the RF signals communicated by each respective subarray 308, along with the control signals used by the beamformer 302 to adjust the subarray signals associated with each beam, enable steering of the beams to focus the energy communicated in a particular direction. The assignment of the subarrays 308 to particular beams and/or the beam weights can be changed dynamically by the controller 324. For example, the controller 324 can re-assign some (or all) of the subarrays 308 to a new beam and/or re-calculate the beam weights to compensate for a change in location of an entity that houses the multi-beam phased array antenna system 300 and/or a location of an external entity communicating with the multi-beam phased array antenna system 300 (e.g., a satellite) or to comply with regulatory requirements.

Additionally, in response to the assigning, the controller 324 provides the control signals to the beamformer 302. More particularly, the controller provides control signals to each of the J number of switches 320. In response to the control signals, each of the switches 320 electrically couples a respective one of the J number of subarrays 308 with a particular BFN 312 of the K number of BFNs 312.

In some examples, each of the K number of BFNs 312 (or some subset thereof) can include a phase shifter 328. Each phase shifter 328 can adjust a phase of each subarray signal communicated with a subset of switches 320 coupled thereto. For example, if the first BFN 312 (BFN 1) is coupled to the first and Jth switches 320 (switch 1 and switch J), the phase shifter 328 of the first BFN 312 can phase shift the first subarray signal communicated with the first subarray 308 and the Jth subarray signal communicated with the Jth subarray 308.

Each phase shifter 328 in the K number of BFNs 312 can apply a phase shift that is based on the control signals. Stated differently, each phase shifter 328 responsive to the control signals provided from the controller 324 shifts a phase of a subset of the J number of subarray signals. In this manner, the control signals provided from the controller 324 can control a state of each of the J number of switches 320 and a phase shifter 328 of each of the BFNs 312.

By implementing the beamformer 302 with analog circuitry, namely the J number of switches and the K number of BFNs 312 a relatively simple, and low power multi-beam phased array antenna system 300 can be provided. Moreover, as demonstrated, the K number of BFNs 312 operate in concert with the J number of switches to facilitate communication on at least two beams contemporaneously.

Figure 4:
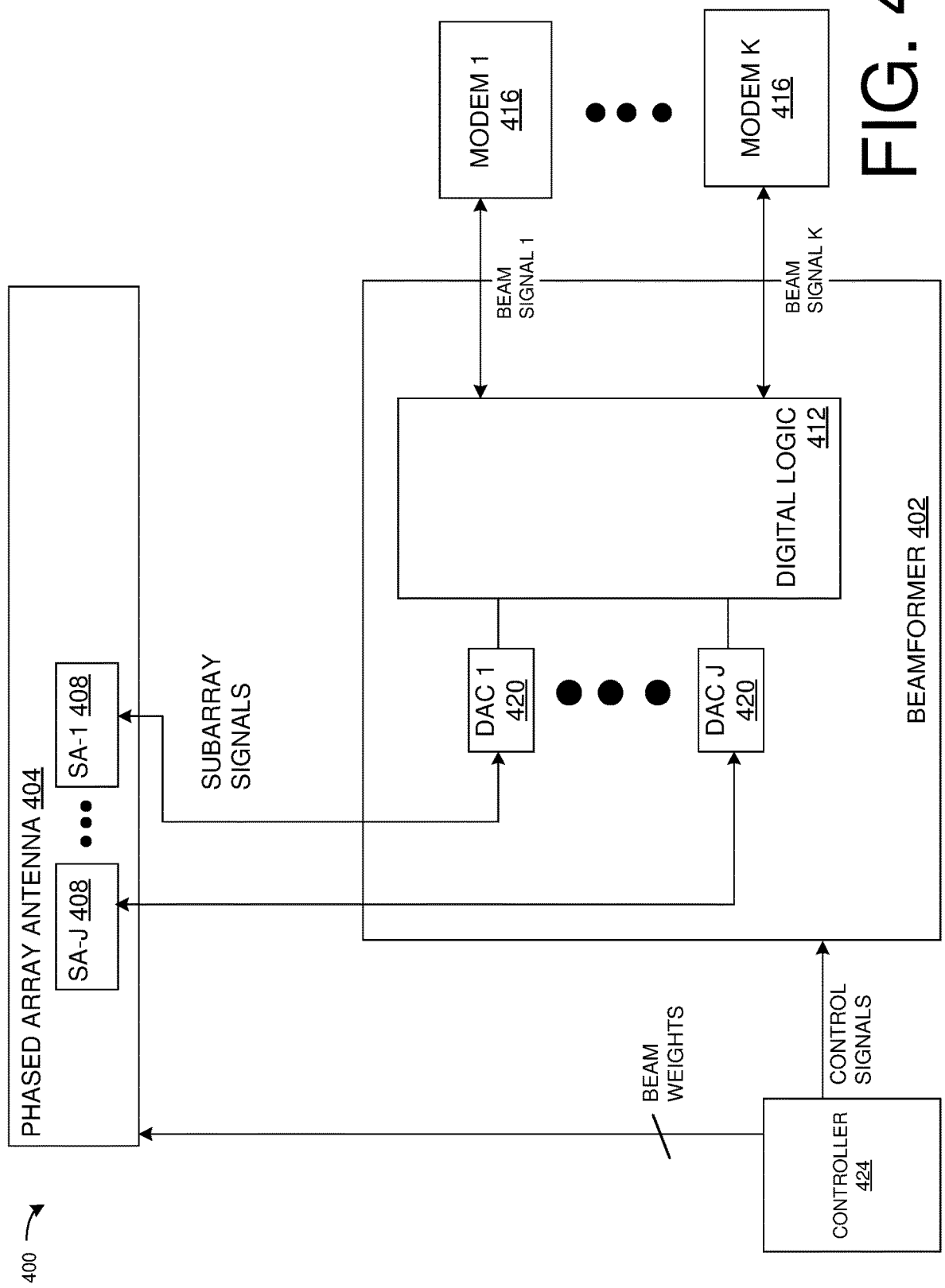
FIG. 4 illustrates a block diagram of a multi-beam phased array antenna system with a beamformer that includes digital circuitry.

FIG. 4 illustrates an example of a multi-beam phased array antenna system 400 that includes a beamformer 402 with digital circuitry. The multi-beam phased array antenna system 400 can be employed to implement the multi-beam phased array antenna system 100 of FIG. 1. Thus, the multi-beam phased array antenna system 400 communicates a plurality beam signals contemporaneously. The beamformer 402 can be employable to implement the beamformer 112 of FIG. 1. Moreover, the multi-beam phased array antenna system 300 includes a phased array antenna 404 that can be employed to implement the phased array antenna 104 of FIG. 1. Thus, the phased array antenna 504 can be formed with J number of subarrays 408, such as the J number of subarrays 108 of FIG. 1. Moreover, each of the J number of subarrays 408 of the phased array antenna 404 can be implemented with an instance of the subarray 200 of FIG. 2. In some examples, the phased array antenna 404 can represent multiple antennas (e.g., a transmit antenna and a receive antenna). In other examples, the phased array antenna 404 represents a single antenna.

Each of the J number of subarrays 408 includes subarray beamforming circuitry that converts between the RF signals and a subarray signal, such that the phased array antenna 404 communicates J number of subarray signals with the beamformer 402. As noted, the beamformer 402 is implemented with digital circuitry. More particularly, the beamformer 402 can include digital logic 412. The digital logic 412 can be implemented, for example with an FPGA or as an application specific integrated circuit (ASIC) chip. In other examples, the digital logic 412 can be implemented as a controller that provides a computing platform to implement a virtual gate array. The digital logic 412 can include logical gates for converting between K number of beam signals and J number of digital subarray signals.

Each of the K number of beam signals can be a transmit or a receive signal that includes embedded data. Each of the K number of beam signals can be communicated with a modem 416 of K number of modems 416. The K number of modems 416 can be employed to encode or decode data on a corresponding beam signal of the K number of beam signals.

The beamformer 402 can include J number of digital to analog converters (DACs) 420. Each of the J number of DACs 420 can be coupled to one of the J number of subarrays 408 and to the digital logic 412. Each of the J number of DACs 420 can convert between a digital subarray signal and an (analog) subarray signal. In some examples, each of the DACs 420 can convert a respective digital subarray signal into an analog version of the digital signal corresponding to a subarray signal that is provided to a respective subarray 408. In other examples, each of the DACs 420 can convert a subarray signal provided from a respective subarray 408 into a digitized version of the subarray signal and provide the corresponding digital subarray signal to the digital logic 412. In still other examples, the DACs 420 can convert a respective digital subarray signal to a respective subarray signal and convert the respective subarray signal into the respective digital subarray signal.

The multi-beam phased array antenna system 400 can include a controller 424 that can control operations of the beamformer 402 and the J number of subarrays 408 of the phased array antenna 404. In some examples, the controller 424 can be employed to implement the controller 120 of FIG. 1. The controller 424 can provide control signals to the beamformer 402 that cause the beamformer 402 to assign the individual subarrays 408 to particular beams. Additionally, the controller 424 can provide the beam weights to the subarray beamforming circuitry of the J number of subarrays 408. Responsive to the beam weights, the subarray beamforming circuitry of each of the J number of subarrays 408 can adjust respective RF signals for communication on respective radiating elements.

More particularly, the control signals provided by the controller 424 can be provided to the digital logic 412 of the beamformer 402. Responsive to the control signals, the digital logic 412 can set signal paths between a respective beam signal and a respective digital subarray signal coupled to one of the J number of DACs 420. The signal paths provide phase delay, combination and/or division for converting between the respective beam signal and the digital subarray signals. Similarly, each of the J number of DACs 420 is responsive to the control signals provided from the controller 424. For example, each of the DACs 420 can apply a beam weight (amplification and/or phase shift) to the digital subarray circuit communicated with the digital logic 412.

In operation, the controller 424 can determine two or more beams from the plurality of beams. The determined two or more beams include two beams of the same communication type (e.g., at least two receive beams or at least two transmit beams). The two or more beams can be determined for example, based on a location of the multi-beam phased array antenna system 400 and a location of an external entity communicating wirelessly with the multi-beam phased array antenna system 400. Additionally or alternatively, in some examples, the controller 424 can determine four (4) beams from the plurality of beams to establish bi-directional communication with two different entities (e.g., two different satellites). This allows the multi-beam phased array antenna system 400 to implement make-before-break communications with the two satellites.

In other examples, the multi-beam phased array antenna system 400 can communicate with three or more satellites contemporaneously. Additionally, in other examples, the controller 424 can be configured to communicate with a particular satellite using only one beam, such that the multi-beam phased array antenna system 400 only transmits or receives data with the particular satellite (e.g., unidirectional communication).

In response to determining the two or more beams from the plurality of beams, the controller 424 can assign disjoint subsets of the J number of subarrays 408 of the phased array antenna 404 to the determined two or more beams. Assignment of the disjoint subsets of the subarrays 408 can be based, for example on characteristics (e.g., aperture size and shape) of the beam being communicated with the external entity.

The controller 424 can calculate the beam weights needed for each individual subarray 408 based on the assigning. The beam weights can characterize a phase shift and/or an amplification of an RF signal needed for the characteristics (e.g., the aperture size and shape) of a particular beam. The beam weights applied by each of the subarrays 408 to adjust (e.g., amplify and/or phase shift) the RF signals communicated by each respective subarray 408, along with the control signals used by the beamformer 402 to adjust the subarray signals associated with each beam, enable steering of the beams to focus the energy communicated in a particular direction. The assignment of the subarrays to particular beams and/or the beam weights can be changed dynamically by the controller 424. For example, the controller 424 can re-assign some (or all) of the subarrays 408 to a new beam and/or re-calculate the beam weights to compensate for a change in location of an entity that houses the multi-beam phased array antenna system 400 and/or a location of an external entity communicating with the multi-beam phased array antenna system 400 (e.g., satellite) or to comply with regulatory requirements.

Additionally, in response to the assigning, the controller 424 provides the control signals to the beamformer 402. More particularly, the controller provides control signals to each of the digital logic 412 and the J number of DACs 420. In response to the control signals, the digital logic 412 provides a signal path between a respective digital subarray signal and a corresponding beam signal of the K number of beam signals. As one example, the digital logic 412 can associate a first set of subarray signals with a first beam of the determined two or more beams associates a second subset of subarray signals with a second beam of the determined two or more beams of the plurality of beams. Additionally, in response to the control signals, each of the J number of DACs 420 can apply beam weights to a respective digital subarray signal and convert between the respective digital subarray signals and a respective subarray signal communicated with a respective subarray 408 of the phased array antenna 404.

By implementing the beamformer 402 with digital circuitry, including the digital logic 412, a simple and dynamic multi-beam phased array antenna system 400 is provided. In particular, the K number of beam signals supported by the digital logic 412 can be changed dynamically (e.g., by reconfiguring the digital logic 412). In this manner, the multi-beam phased array antenna system 400 can be adapted to change operations over time without changing hardwired circuitry.

Figure 5:
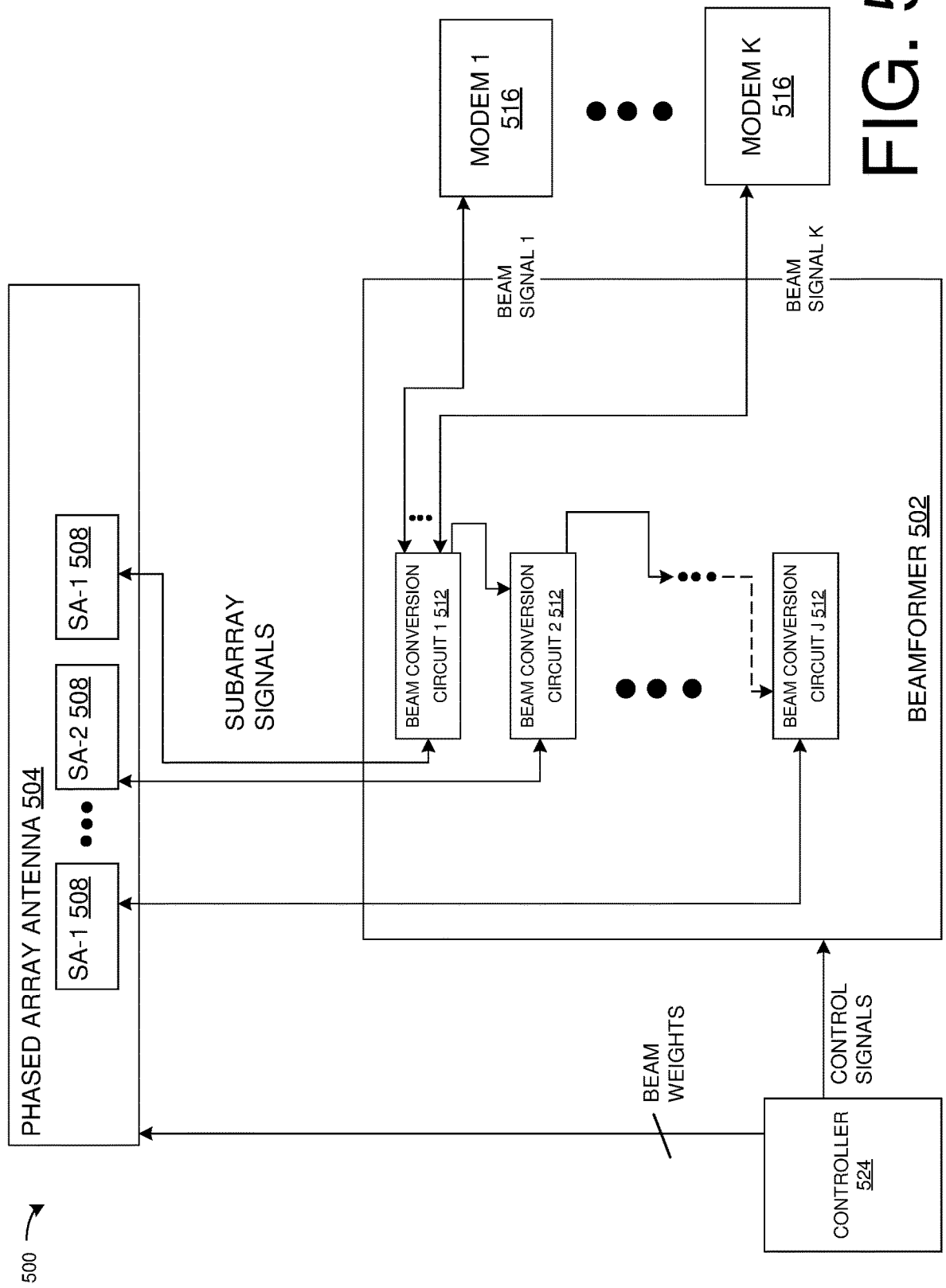
FIG. 5 illustrates a block diagram of a multi-beam phased array antenna system with a beamformer that includes systems in beam conversion circuits.

FIG. 5 illustrates an example of a multi-beam phased array antenna system 500 that includes a beamformer 502 implemented with a plurality of IC chips. The multi-beam phased array antenna system 500 can be employed to implement the multi-beam phased array antenna system 100 of FIG. 1. Thus, the multi-beam phased array antenna system 500 communicates a plurality of beam signals contemporaneously. The beamformer 502 can be employable to implement the beamformer 112 of FIG. 1. Moreover, the multi-beam phased array antenna system 300 includes a phased array antenna 504 that can be employed to implement the phased array antenna 104 of FIG. 1. Thus, the phased array antenna 504 can be formed with J number of subarrays 508, such as the J number of subarrays 108 of FIG. 1. Moreover, each of the J number of subarrays 508 of the phased array antenna 504 can be implemented with an instance of the subarray 200 of FIG. 2. In some examples, the phased array antenna 504 can represent multiple antennas (e.g., a transmit antenna and a receive antenna). In other examples, the phased array antenna 504 represents a single antenna.

Each of the J number of subarrays 508 can include subarray beamforming circuitry that converts between the RF signals and a subarray signal, such that the phased array antenna 504 communicates J number of subarray signals with the beamformer 502. As noted, the beamformer 502 is implemented with a plurality of IC chips. More particularly, the beamformer 502 can include J number of interconnected beam conversion circuits 512, wherein each of the J number of interconnected beam conversion circuits 512 is coupled to one, and only one of the subarrays 508. In some examples, each of the J number of beam conversion circuits 512 can be implemented as an ASIC or a controller with embedded instructions. In other examples, each of the J number of beam conversion circuits 512 can be implemented with discrete circuit components. In the example illustrated, the J number of beam conversion circuits 512 are arranged in a daisy-chain to allow each of the J number of beam conversion circuits 512 to communicate. In other examples, each of the J number of beam conversion circuits 512 can communicate on a communication bus of the beamformer 502.

Each of the J number of beam conversion circuits 512 can convert between a respective subarray signal and K number of beam signals. Each of the K number of beam signals can be a transmit or a receive signal that includes embedded data. Each of the K number of beam signals can be communicated with a modem 516 of K number of modems 516. The K number of modems 516 can be employed to encode or decode data on a corresponding beam signal of the K number of beam signals.

In the example illustrated, each of the K number of modems 516 communicates with the first beam conversion circuit 512 (beam conversion circuit 1). In such a situation, the first beam conversion circuit 512 can relay beam signals to other beam conversion circuits 512. In other examples, each of the K number of modems 516 can communicate with the beam conversion circuits 512 through a communication bus. Each of the J number of beam conversion circuits 512 can include an internal DAC (or other circuitry) to convert between one of the K number of beam signals and a subarray signal.

The multi-beam phased array antenna system 500 can include a controller 524 that can control operations of the beamformer 502 and the J number of subarrays 508 of the phased array antenna 504. In some examples, the controller 524 can be employed to implement the controller 120 of FIG. 1. The controller 524 can provide control signals to the beamformer 502 that cause the beamformer 502 to assign the individual subarrays 508 to particular beams. Additionally, the controller 524 can provide the beam weights to the subarray beamforming circuitry of the J number of subarrays 508. Responsive to the beam weights, the subarray beamforming circuitry of each of the J number of subarrays 508 can adjust respective RF signals for communication on respective radiating elements.

More particularly, the control signals provided by the controller 524 can provide control signals to the J number of beam conversion circuits 512 of the beamformer 502. Responsive to the control signals, the J number of beam conversion circuits 512 can set signal paths between a respective beam signal and a respective digital subarray signal coupled to one of the J number of beam conversion circuits 512. The signal paths can provide phase delay, combination and/or division for converting between the respective beam signal and the subarray signals.

In operation, the controller 524 can determine two or more beams from the plurality of beams. The determined two or more beams include two beams of the same communication type (e.g., at least two receive beams or at least two transmit beams). The two or more beams can be determined for example, based on a location of the multi-beam phased array antenna system 500 and a location of an external entity communicating wirelessly with the multi-beam phased array antenna system 500. Additionally or alternatively, in some examples, the controller 524 can determine four (4) beams from the plurality of beams to establish bi-directional communication with two different entities (e.g., two different satellites). This allows the multi-beam phased array antenna system 500 to implement make-before-break communications with the two satellites.

In other examples, the multi-beam phased array antenna system 500 can communicate with three or more satellites contemporaneously. Additionally, in other examples, the controller 524 can be configured to communicate with a particular satellite using only one beam, such that the multi-beam phased array antenna system 500 only transmits or receives data with the particular satellite (e.g., unidirectional communication).

In response to determining the two or more beams from the plurality of beams, the controller 524 can assign disjoint subsets of the J number of subarrays 508 of the phased array antenna 504 to the determined two or more beams. Assignment of the disjoint subsets of the subarrays 508 can be based, for example on characteristics (e.g., aperture size and shape) of the beam being communicated with the external entity.

The controller 524 can calculate the beam weights needed for each individual subarray 508 based on the assigning. The beam weights can characterize a phase shift and/or an amplification of an RF signal needed for the characteristics (e.g., the aperture size and shape) of a particular beam. The beam weights applied by each of the subarrays 508 to adjust (e.g., amplify and/or phase shift) the RF signals communicated by each respective subarray 508, along with the control signals used by the beamformer 502 to adjust the subarray signals associated with each beam, enable steering of the beams to focus the energy communicated in a particular direction. The assignment of the subarrays to particular beams and/or the beam weights can be changed dynamically by the controller 524. For example, the controller 524 can re-assign some (or all) of the subarrays 508 to a new beam and/or re-calculate the beam weights to compensate for a change in location of an entity that houses the multi-beam phased array antenna system 500 and/or a location of an external entity communicating with the multi-beam phased array antenna system 500 (e.g., a satellite) or to comply with regulatory requirements.

Additionally, in response to the assigning, the controller 524 provides the control signals to the beamformer 502. More particularly, the controller provides control signals to the J number of beam conversion circuits 512. In response to the control signals, each of the J number of beam conversion circuits 512 provides a signal path between a respective subarray signal and a corresponding beam signal of the K number of beam signals. Additionally, in response to the control signals, each of the J number of beam conversion circuits 512 can apply beam weights to a respective digital subarray signal and convert between the respective digital subarray signal and a respective subarray signal communicated with a respective subarray 508 of the phased array antenna 504.

By implementing the beamformer 502 with the J number of beam conversion circuits 512, a simple and dynamic multi-beam phased array antenna system 500 is provided. In particular, the K number of beam signals supported by the J number of beam conversion circuits 512 can be changed dynamically (e.g., by reconfiguring each of the J number of beam conversion circuits 512). In this manner, the multi-beam phased array antenna system 500 can be adapted to change operations over time without changing hardwired circuitry.

Figure 6:
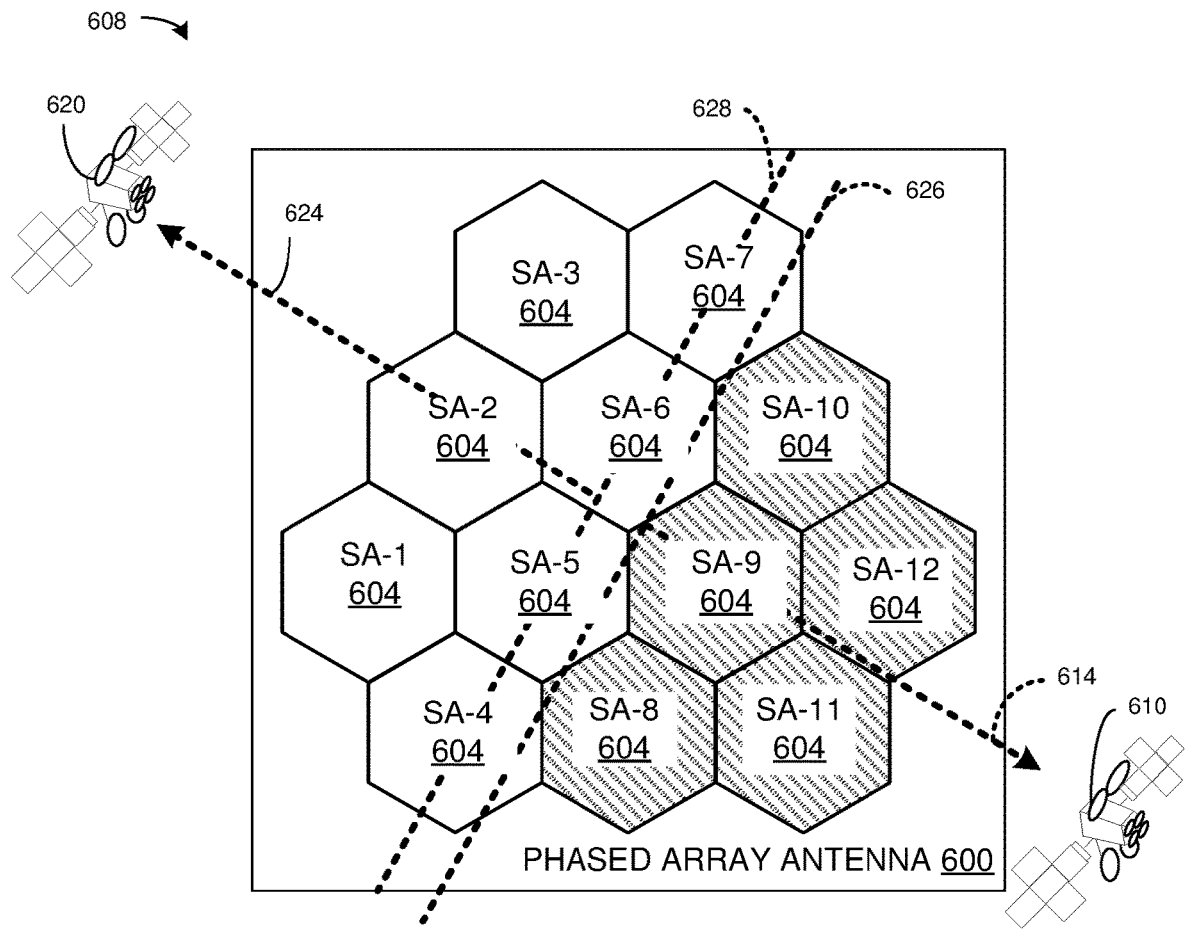
FIG. 6 illustrates a first example of a phased array antenna communicating on two beams contemporaneously.
Figure 7:
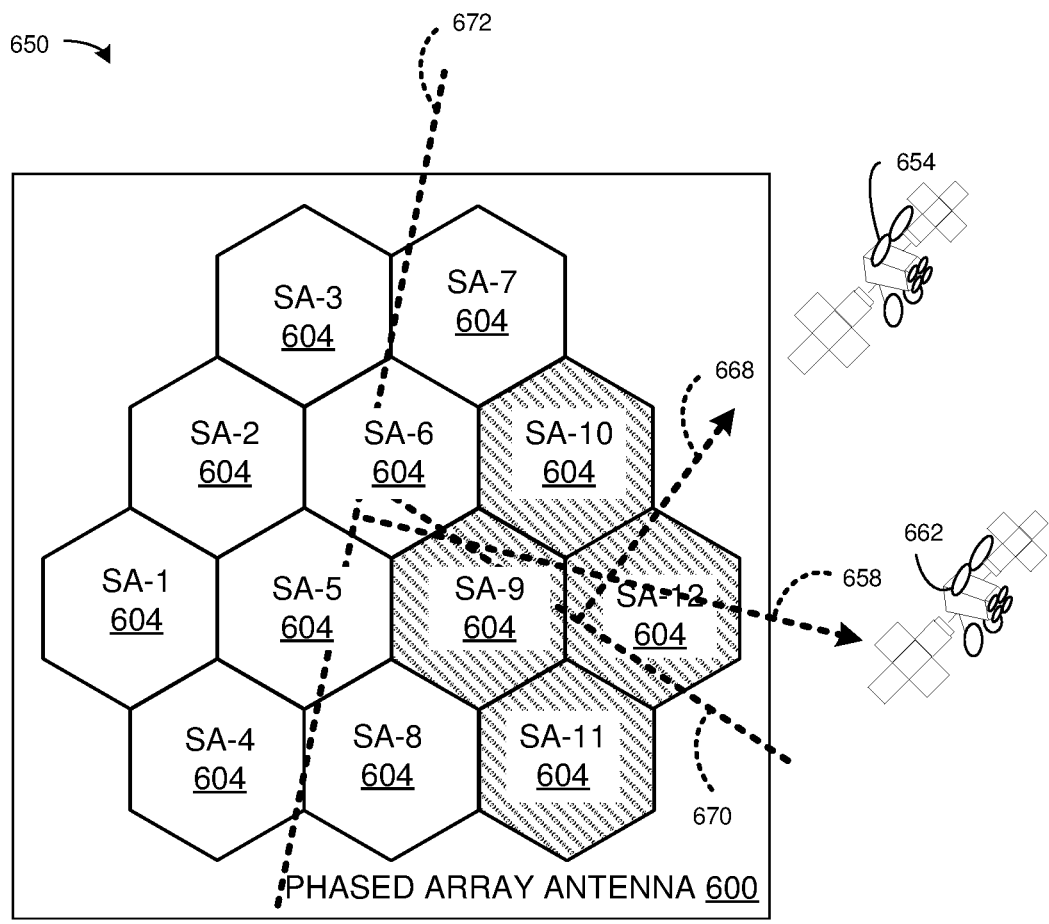
FIG. 7 illustrates a second example of a phased array antenna communicating with two beams contemporaneously.
Figure 8:
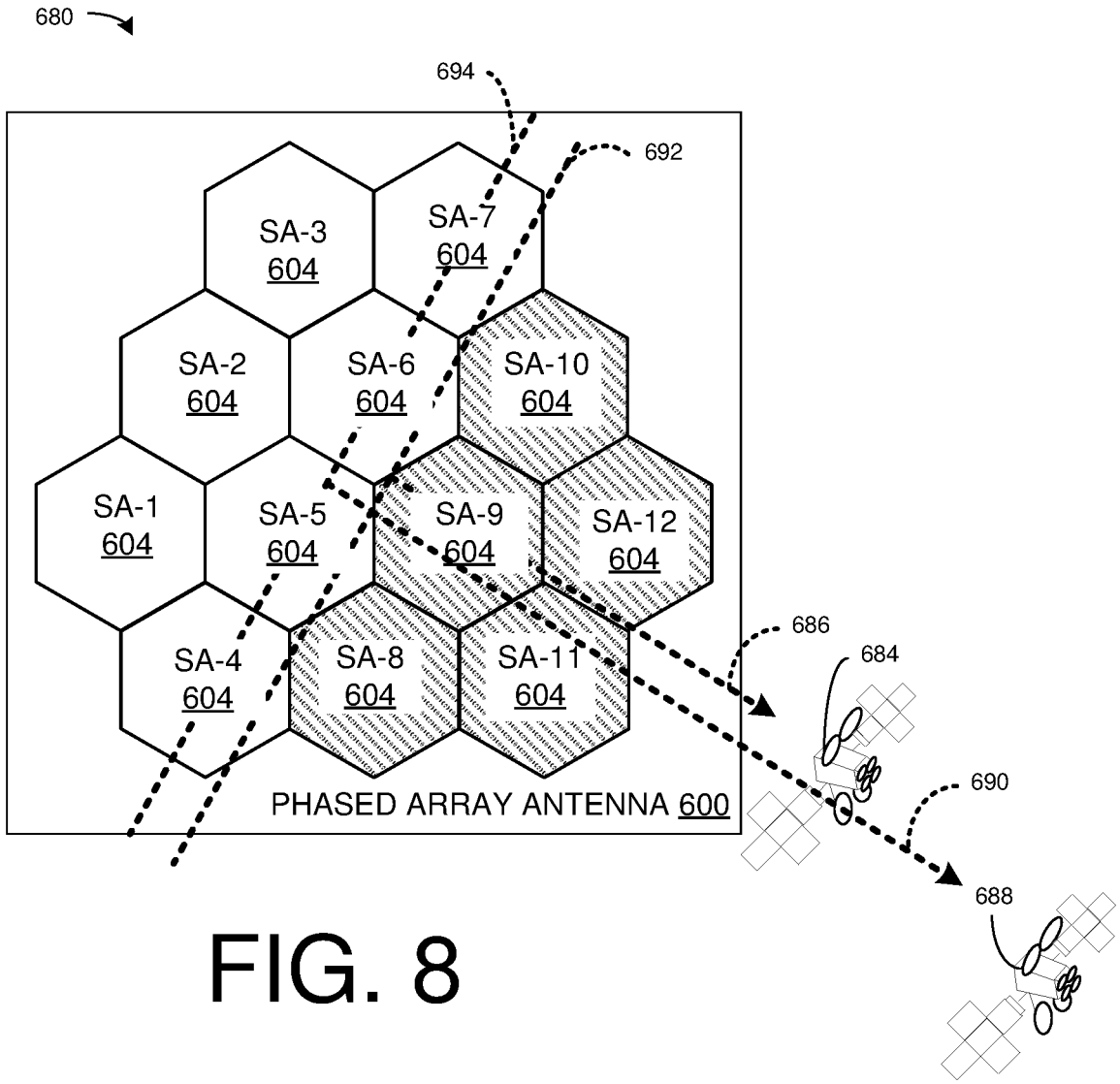
FIG. 8 illustrates a third example of a phased array antenna communicating on two beams contemporaneously.

FIGS. 6-8 illustrate an example of a phased array antenna 600 that communicates two beams contemporaneously. The phased array antenna 600 can be employed to implement the phased array antenna 104 of FIG. 1. The phased array antenna 600 includes twelve subarrays 604 labeled SA-1 . . . SA-12. In other examples, there can be more or fewer subarrays 604. Each subarray 604 can be implemented with the subarray 200 of FIG. 2.

FIG. 6 illustrates an example 608 where the phased array antenna 600 communicates with a low Earth orbit (LEO) satellite 610 through a first beam in a first direction 614 and a geosynchronous Earth orbit (GEO) satellite 620 through a second beam in a second direction 624. In the example illustrated in FIG. 6, subarrays 8-12 (SA-8 . . . SA-12) are assigned to communicate on the first beam and the first direction 614, and subarrays 1-7 (SA-1 . . . SA-7) communicate on the second beam in the second direction 624. In the example 608 of FIG. 6, it is presumed that the first direction 614 and the second direction 624 are opposing (or nearly opposing) directions. For purposes of illustration, a first line 626 perpendicular to the first direction 614 is included, and a second line 628 perpendicular to the second direction 624 is also included. In the example 608 illustrated in FIG. 6, there are more subarrays 604 assigned to the second beam to communicate with the GEO satellite 620 than subarrays 604 assigned to the first beam to communicate with the LEO satellite 610. In some examples, more subarrays 604 could be assigned to the second beam to communicate with the GEO satellite 620 to compensate for the GEO satellite 620 being further from the phased array antenna 600 then the LEO satellite 610.

FIG. 7 illustrates an example 650 where the phased array antenna 600 communicates with a LEO satellite 654 through a first beam in a first direction 658 and a GEO satellite 662 through a second beam in a second direction 668. In the example 650 illustrated in FIG. 7, subarrays 9-12 (SA-8 . . . SA-12) are assigned to communicate on the first beam and the first direction 658, and subarrays 1-8 (SA-1 . . . SA-8) communicate on the second beam in the second direction 624. For purposes of illustration, a first line 670 perpendicular to the first direction 658 is included, and a second line 672 perpendicular to the second direction 668 is also included. In the example 650 illustrated in FIG. 7, there are more subarrays 604 assigned to the second beam to communicate with the GEO satellite 662 than subarrays 604 assigned to the first beam to communicate with the LEO satellite 654 (e.g., to compensate for the distance of the GEO satellite 662 relative to the LEO satellite 654).

FIG. 8 illustrates an example 680 where the phased array antenna 600 communicates with a LEO satellite 684 through a first beam in a first direction 686 and a GEO satellite 688 through a second beam in a second direction 690. In the example 680, the first direction 686 and the second direction 690 are presumed to be nearly the same direction. Moreover, as illustrated in FIG. 8, subarrays 8-12 (SA-8 . . . SA-12) are assigned to communicate on the first beam and the first direction 686, and subarrays 1-8 (SA-1 . . . SA-8) communicate on the second beam in the second direction 690. For purposes of illustration, a first line 692 perpendicular to the first direction 686 is included, and a second line 694 perpendicular to the second direction 690 is also included. In the example 680 illustrated in FIG. 8, there are more subarrays 604 assigned to the second beam to communicate with the GEO satellite 688 than subarrays 604 assigned to the first beam to communicate with the LEO satellite 684 (e.g., to compensate for the distance of the GEO satellite 688 relative to the LEO satellite 684).

As illustrated in FIGS. 6-8, the phased array antenna 600 can communicate with different satellites using multiple beams contemporaneously. Moreover, as demonstrated in FIGS. 1-5, the phased array antenna 600 of FIGS. 6-8 can be changed dynamically to change directions of the beams.

Figure 9:
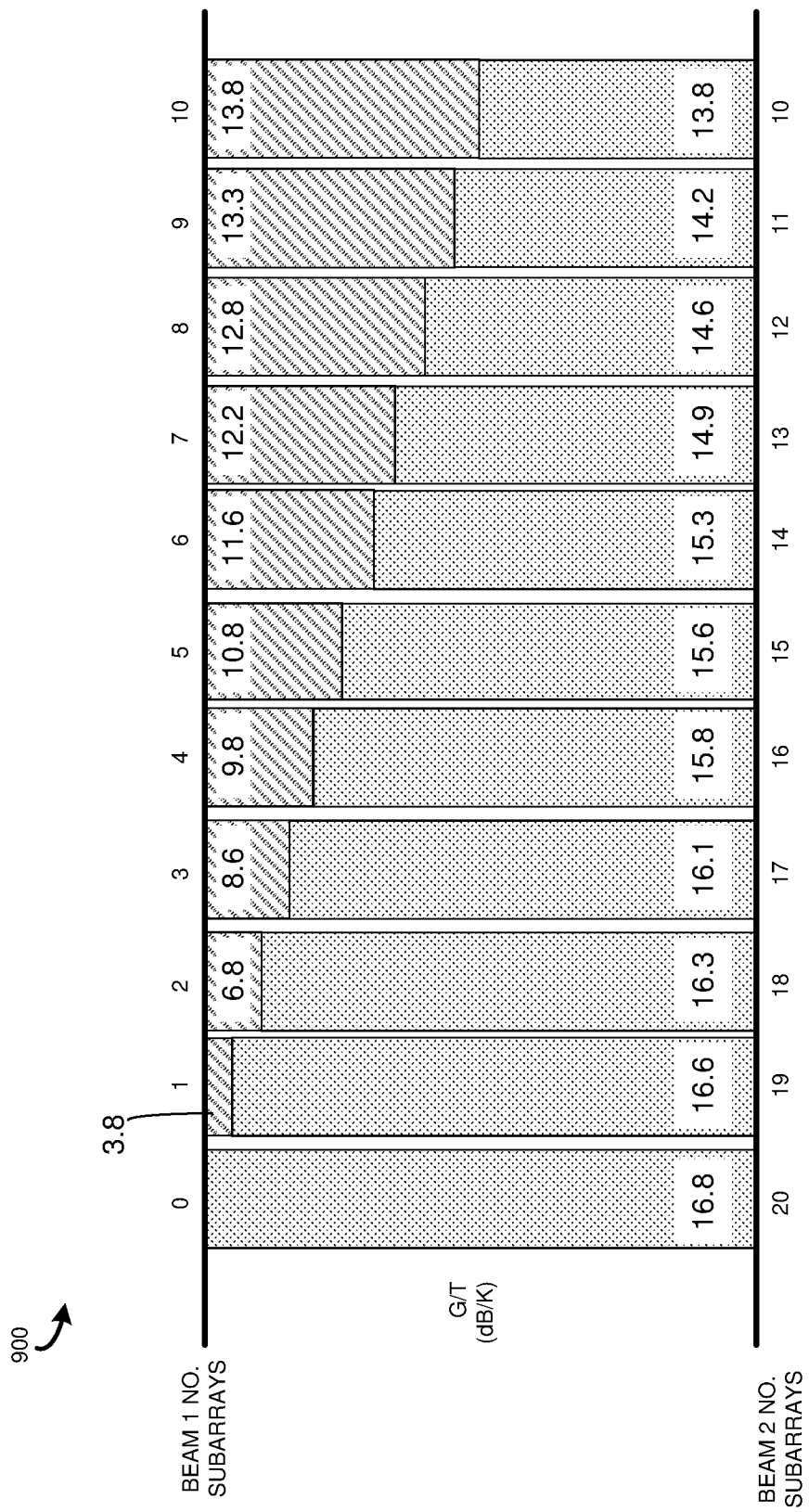
FIG. 9 illustrates an example chart of boresight gain-to-noise temperature for different numbers of subarrays assigned to two beams of a phased array antenna.

FIG. 9 illustrates an example chart 900 of boresight gain-to-noise temperature (in decibels per Kelvin (dB/K)) for different number of subarrays assigned to two beams of a phased array antenna, such as the phased array antenna 104 of FIG. 1. In the example illustrated by the chart 900, the phased array antenna includes 20 subarrays and each subarray is assigned to one of the two beams. The chart 900 demonstrates that the performance of the beams can be changed by changing the number of subarrays are assigned. As is illustrated in the chart 900, the more subarrays assigned to a particular beam (beam 1 or beam 2) the higher the performance for the particular beam.

Figure 10:
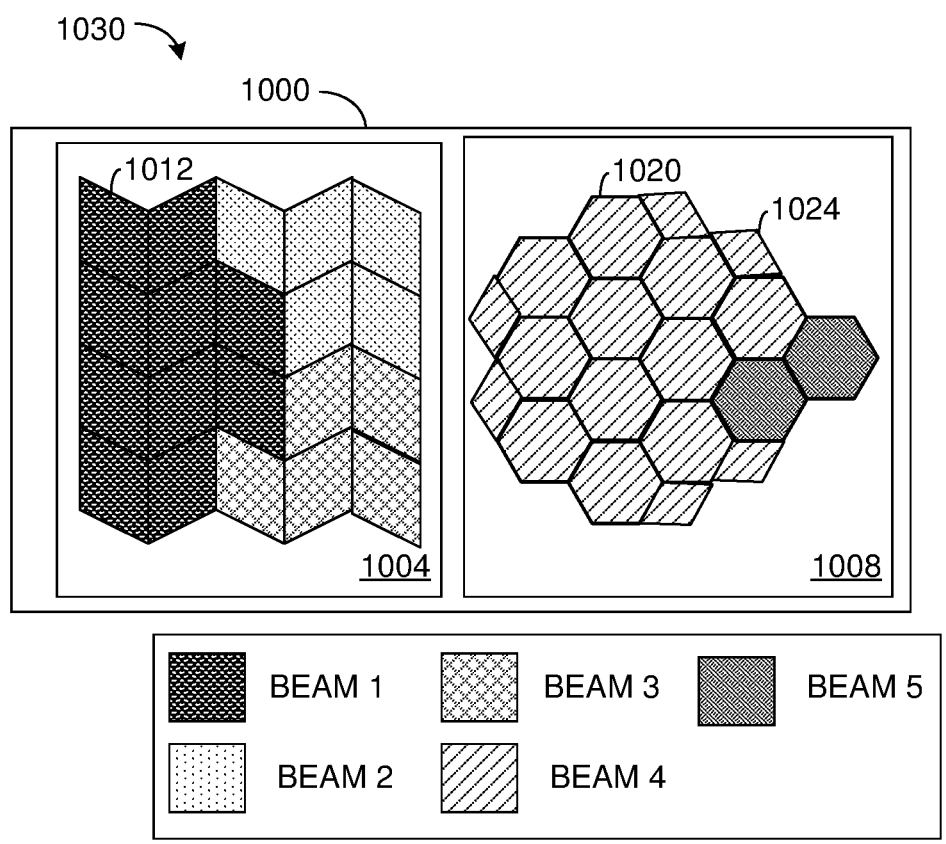
FIG. 10 illustrates a first example of an antenna system with two phased array antennas each communicating two or more different beams contemporaneously.
Figure 11:
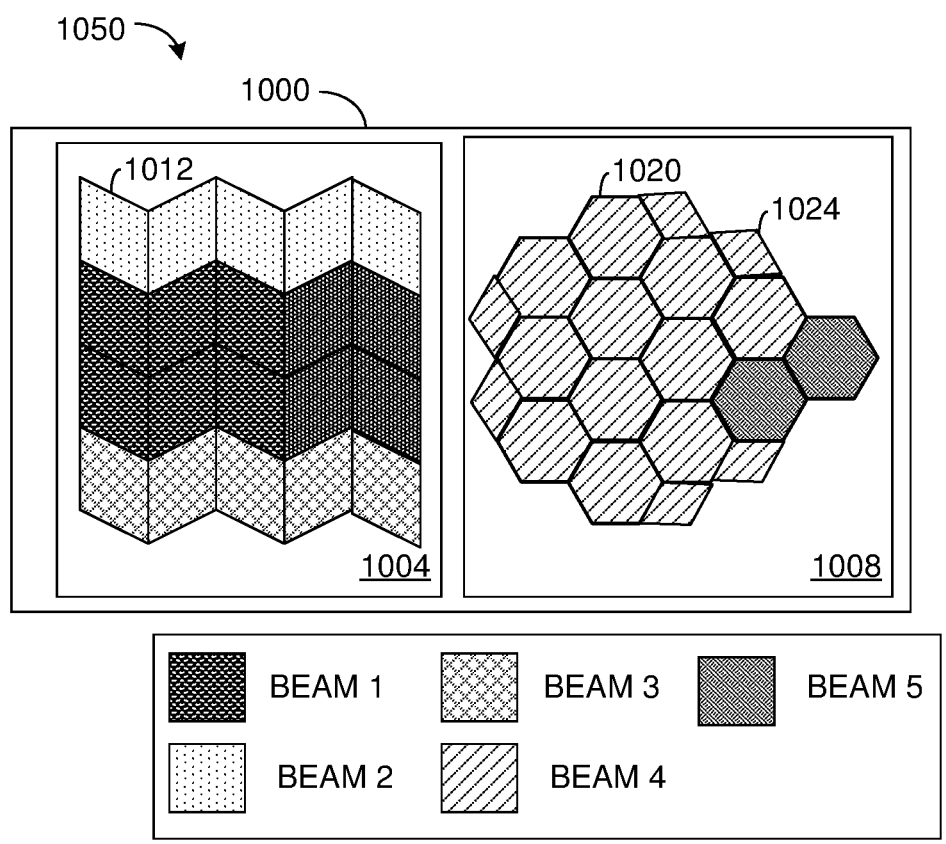
FIG. 11 illustrates a second example of an antenna system with two phased array antennas each communicating two or more different beams contemporaneously.
Figure 12:
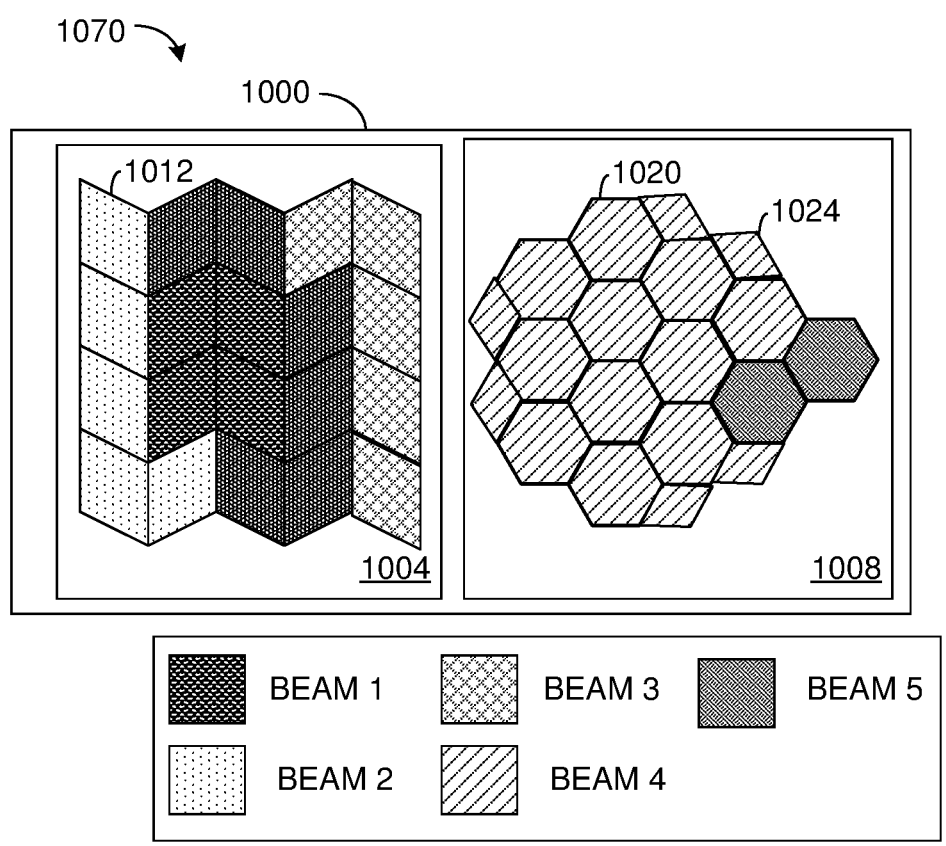
FIG. 12 illustrates a first example of an antenna system with two phased array antennas each communicating on two or more different beams contemporaneously.

FIGS. 10-12 illustrate examples of a multi-beam phased array antenna system 1000 that includes a first phased array antenna 1004 and a second phased array antenna 1008. The first phased array antenna 1004 can be configured as a transmit antenna for transmitting a beam to an external entity, such as a satellite. The second phased array antenna 1008 can be configured as a receipt antenna for receiving a beam transmitted from an external entity, such as a satellite. Thus, in some examples the first phased array antenna 1004 can be employed to transmit a beam to a given satellite, and the second phased array antenna 1008 can be employed to receive a beam from the given satellite. In this manner, the multi-beam phased array antenna system 1000 allows bidirectional communication with the given satellite.

The first phased array antenna 1004 and the second phased array antenna 1008 can each be employed to implement the phased array antenna 104 of FIG. 1. In the illustrated example, the first phased array antenna 1004 and the second phased array antenna 1008 are spaced apart from each other. In other examples, the first phased array antenna 1004 and the second phased array antenna 1008 may overlay each other, such that the radiating elements of the subarrays used for transmission are within a first region that at least partially overlaps with a second region that contains the radiating elements of the subarrays used for reception.

The first phased array antenna 1004 includes a plurality of rhombus shaped subarrays 1012, only one of which is labeled. Each of the rhombus shaped subarrays 1012 can be employed to implement an instance of the subarray 200 of FIG. 2. The second phased array antenna 1008 includes a plurality of hexagonal shaped subarrays 1020 and a plurality of rhombus shaped subarrays 1024, only one of each is labeled. Each of the hexagonal shaped subarrays 1020 and the rhombus shaped subarrays 1024 of the second phased array antenna 1008 can also be employed to implement an instance of the subarray 200 of FIG. 2.

Disjoint subsets of the plurality of rhombus shaped subarrays 1012 of the first phased array antenna 1004 can be assigned to communicate (receive) different beams. Similarly, disjoint subsets of the plurality of hexagonal shaped subarrays 1020 and the rhombus shaped subarrays 1024 of the second phased array 1008 can be assigned to communicate (transmits) different beams.

FIG. 10 illustrates an example 1030 where the multi-beam phased array antenna system 1000 includes two phased array antennas that each communicate two or more beams. More particularly, in the example 1030, the subarrays of the first phased array antenna 1004 are assigned to three different receive beams, namely beam 1 beam 2 and beam 3. Additionally, in the example 1030, the subarrays of the second phased array antenna 1008 are assigned to transmit beams, namely beam 4 and beam 5. Alternatively, the subarrays assigned to each beam, and the number of transmit and/or receive beams, may be different than this example. FIG. 10 includes a legend identifying beams that individual rhombus shaped subarrays 1012 of the first phased array antenna 1004 are assigned, and the hexagonal shaped subarrays 1020 and the rhombus shaped subarrays 1024 of the second phased array antenna 1008 are assigned. In the example of FIG. 10, the two phased array antennas 1004 and 1008 are arranged separately, such that the FIG. 11 illustrates another example 1050 where the multi-beam phased array antenna system 1000 communicates with five beams contemporaneously, with different assignments of disjoint subarrays. FIG. 12 illustrates yet another example 1070 where the multi-beam phased array antenna system 1000 communicates with five beams contemporaneously, with different assignments of disjoint subarrays.

As demonstrated in FIGS. 10-12, the same multi-beam phased array antenna system 1000 can be employed to communicate on multiple beams contemporaneously. Moreover, the assignment of subarrays (e.g., the rhombus shaped subarrays 1012 of the first phased array antenna 1004 and the hexagonal shaped subarrays 1020 and the rhombus shaped subarrays 1024 of the second phased array antenna 1008) are dynamically assignable to control pointing direction, performance, and aperture shape of the beams communicated by the multi-beam phased array antenna system 1000.

Figure 13:
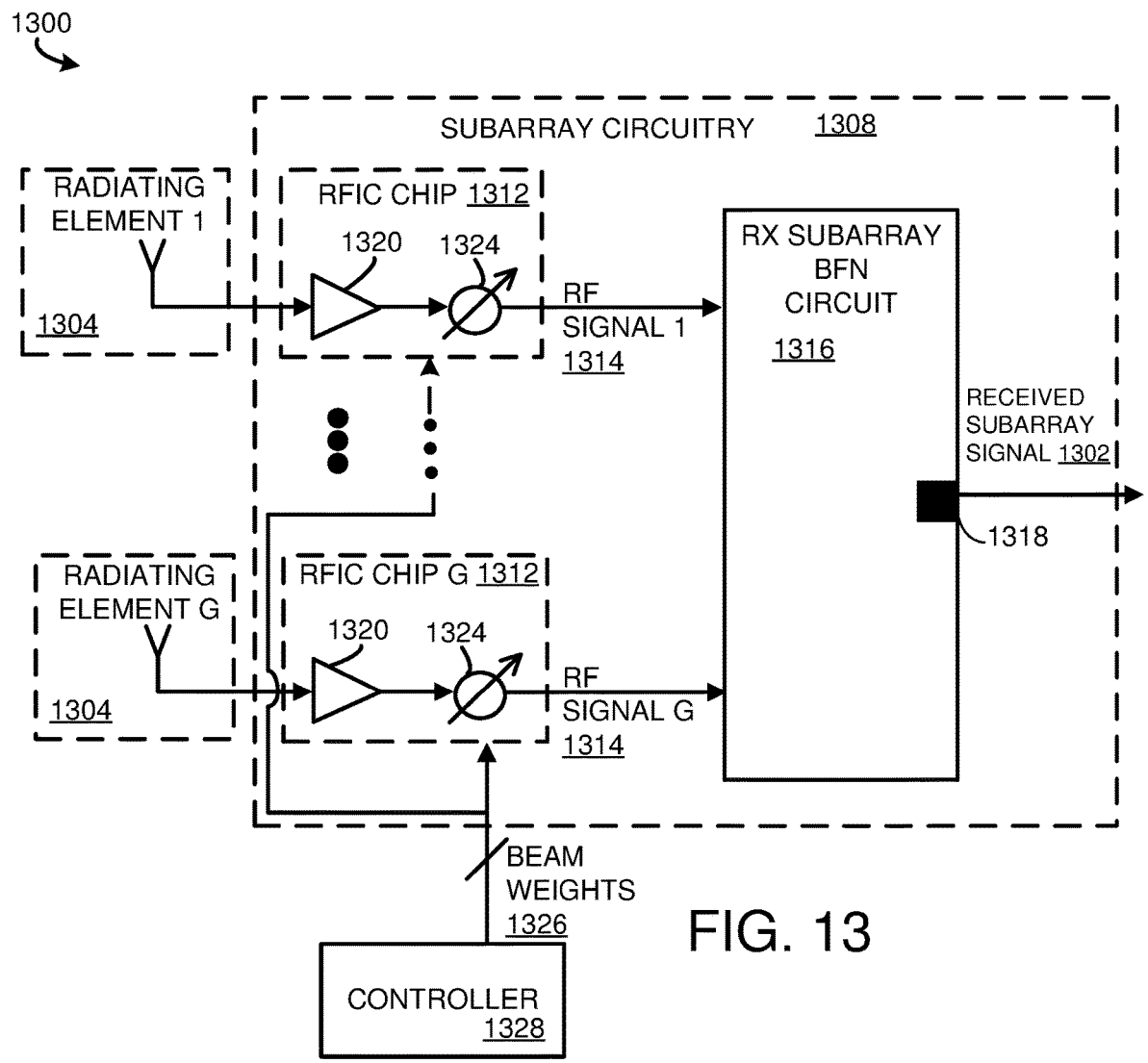
FIG. 13 illustrates an example of a subarray of a phased array antenna operating in receiving mode.

FIG. 13 illustrates a block diagram of a subarray 1300 for a phased array antenna that depicts the logical interconnection of one of the J number of subarrays 108 of FIG. 1 and/or the subarray 200 of FIG. 2 operating in receiving mode. The subarray 1300 can be dynamically assigned to a particular beam of a plurality of beams. Moreover, the subarray 1300 can be employed to provide a received subarray signal 1302 to a beamformer. The beamformer can be implemented with the architecture of the beamformer 112 of FIG. 1, the beamformer 302 of FIG. 3 or the beamformer 402 of FIG.

4. In the illustrated example, G number of radiating elements 1304 communicate with subarray beamforming circuitry 1308.

The subarray beamforming circuitry 1308 can include G number of RFIC chips 1312 and a receiving (RX) subarray BFN circuit 1316. Each of the G number of RFIC chips 1312 can be coupled to a respective radiating element 1304. Each of the RFIC chips 1312 adjusts a received RF signal 1314 and provides an adjusted RF signal 1314 to a RX subarray BFN circuit 1316. The RX subarray BFN circuit 1316 can be employed to implement the subarray BFN 212. The RX subarray BFN circuit 1316 can be coupled to the beamformer. The RX subarray BFN circuit 1316 can combine the G number of RF signals 1314 from the G number of RFIC chips 1312 to form a received subarray signal 1302. The received subarray signal 1302 can be provided to the beamformer. The RX subarray BFN circuit can include a port 1318 that is coupled to the beamformer. The RX subarray BFN circuit 1316 can provide the beamformer the received subarray signal 1302 through the port 1318.

In the illustrated example, each RFIC chip 1312 can include an amplifier 1320 and a phase shifter 1324. The G number of RFIC chips 1312 can receive beam weights 1326 from a controller 1328 that can be implemented with the controller 120 of FIG. 1. The beam weights 1326 can be calculated by the controller 1328 based on the beam to which the subarray 1300 is assigned. In some examples, the beam weights 1326 can control a gain of each amplifier 1320 and/or a phase shift applied by each phase shifter 1324. Thus, in some examples, each amplifier 1320 can be implemented as a variable gain amplifier, a switched attenuator circuit, etc.

In operation, a signal received by each of the G number of radiating elements 1304 (or some subset thereof) can be converted into an RF signal 1314 and provided to a corresponding RFIC chip 1312 for adjustment. Each amplifier 1320 of the RFIC chips 1312 amplifies the provided RF signal 1314 and each phase shifter 1324 can apply a phase shift to output G number of adjusted RF signals 1314. In some examples of the subarray 1300 of FIG. 13, the phase shifters 1324 can apply a variable amount of phase adjustment in response to the beam weights 1326 provided from the controller 1328. Additionally or alternatively, the amplifiers 1320 can provide a variable amount of amplitude adjustment in response to the beam weights 1326 provided from the controller 1328. The G number of RF signals 1314 can be provided to the RX subarray BFN circuit 1316. The RX subarray BFN circuit 1316 can combine the G number of RF signals 1314 to form the received subarray signal 1302 that can be provided to the beamformer for further processing.

Figure 14:
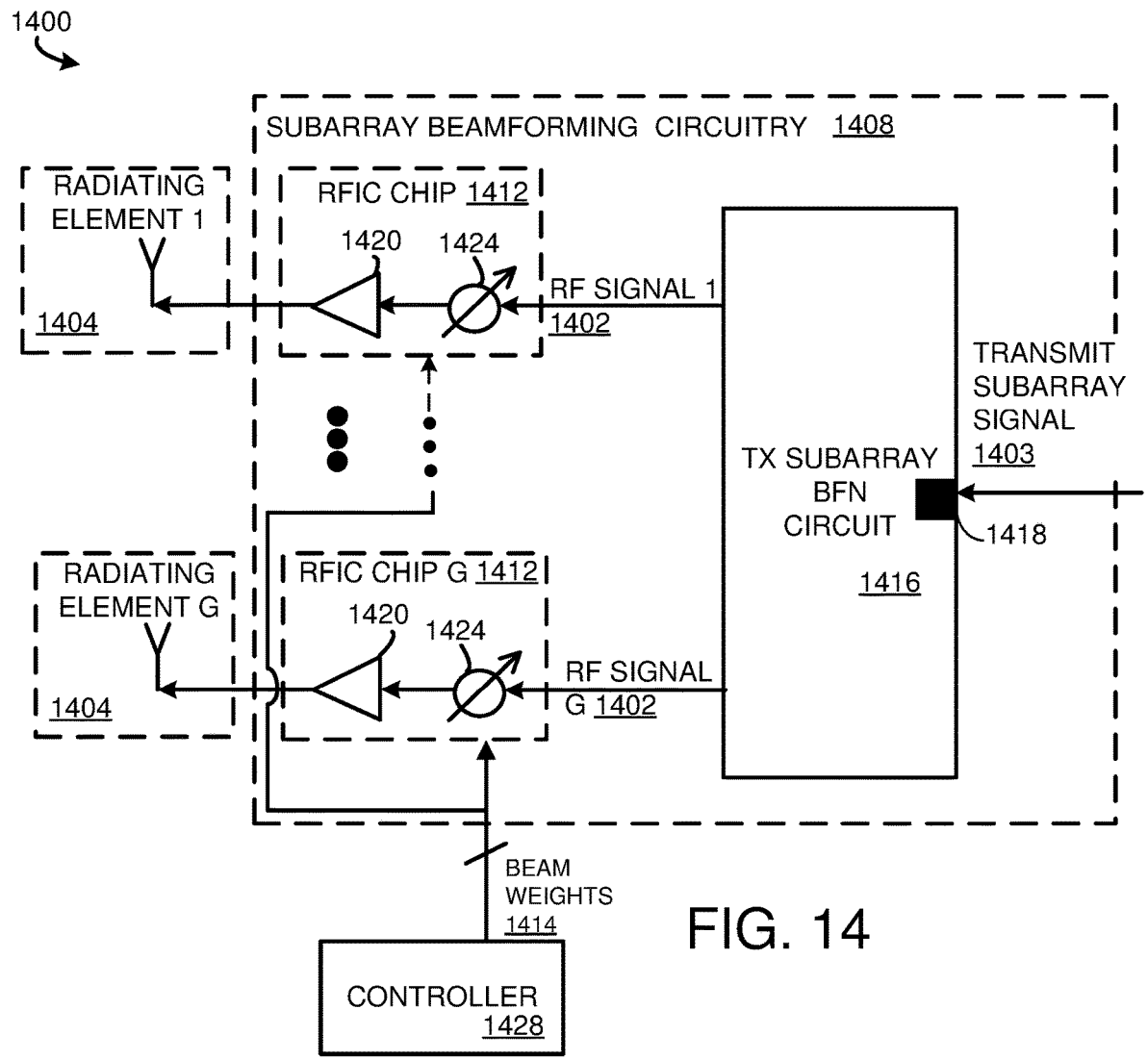
FIG. 14 illustrates an example of a subarray of a phased array antenna operating in transmitting mode.

FIG. 14 illustrates a block diagram of a subarray 1400 for a phased array antenna that depicts the logical interconnection of one of the J number of subarrays 108 of FIG. 1 and/or the subarray 200 of FIG. 2 operating in transmitting mode. The subarray 1400 can be dynamically assigned to a particular beam of a plurality of beams. Moreover, the subarray 1400 can be employed to transmit RF signals 1402 into free space in response to receiving a subarray signal 1403 from a beamformer. The beamformer can be implemented with the architecture of the beamformer 112 of FIG. 1, the beamformer 302 of FIG. 3 or the beamformer 402 of FIG. 4. In the illustrated example, G number of radiating elements 1404 communicate with subarray beamforming circuitry 1408.

The subarray beamforming circuitry 1408 can include G number of RFIC chips 1412 and a transmit (TX) subarray BFN circuit. Each of the G number of RFIC chips 1412 can be coupled to a respective radiating element 1404. Each of the RFIC chips 1412 adjusts an RF signal 1402 received from the TX subarray BFN circuit 1416 and provides an adjusted RF signal 1402 to a respective radiating element 1404. The TX subarray BFN circuit 1416 can be employed to implement the subarray BFN 212 of FIG. 2. The TX subarray BFN circuit 1416 can be coupled to the beamformer through a port 1418.

In the illustrated example, each RFIC chip 1312 can include an amplifier 1420 and a phase shifter 1424. The G number of RFIC chips 1412 can receive beam weights 1414 from a controller 1428 that can be implemented with the controller 120 of FIG. 1. The beam weights 1414 can be calculated by the controller 1428 based on the particular beam to which the subarray 1400 is assigned. In some examples, the beam weights 1414 can control a gain of each amplifier 1420 and/or a phase shift applied by each phase shifter 1424. Thus, in some examples, each amplifier 1420 can be implemented as a variable gain amplifier, a switched attenuator circuit, etc.

In operation, the transmit beam signal 1403 can be provided from the beamformer to the TX subarray BFN circuit 1416. The TX subarray BFN circuit 1416 divides the transmit beam signal 1403 into G number of RF signals 1402 that can be provided to the G number of RFIC chips 1412. Each of the G number of RFIC chips 1412 can adjust a corresponding RF signal 1402 to generate an adjusted RF signal 1402 that can be provided to a corresponding radiating element 1404. In some examples of the subarray 1400 of FIG. 13, the phase shifters 1424 can apply a variable amount of phase adjustment in response to the beam weights 1414 provided from the controller 1428. Additionally or alternatively, the amplifiers 1420 can provide a variable amount of amplitude adjustment in response to the beam weights 1414 provided from the controller 1428. Each radiating element 1404 propagates the corresponding adjusted RF signal 1402 into free space.

Figure 15:
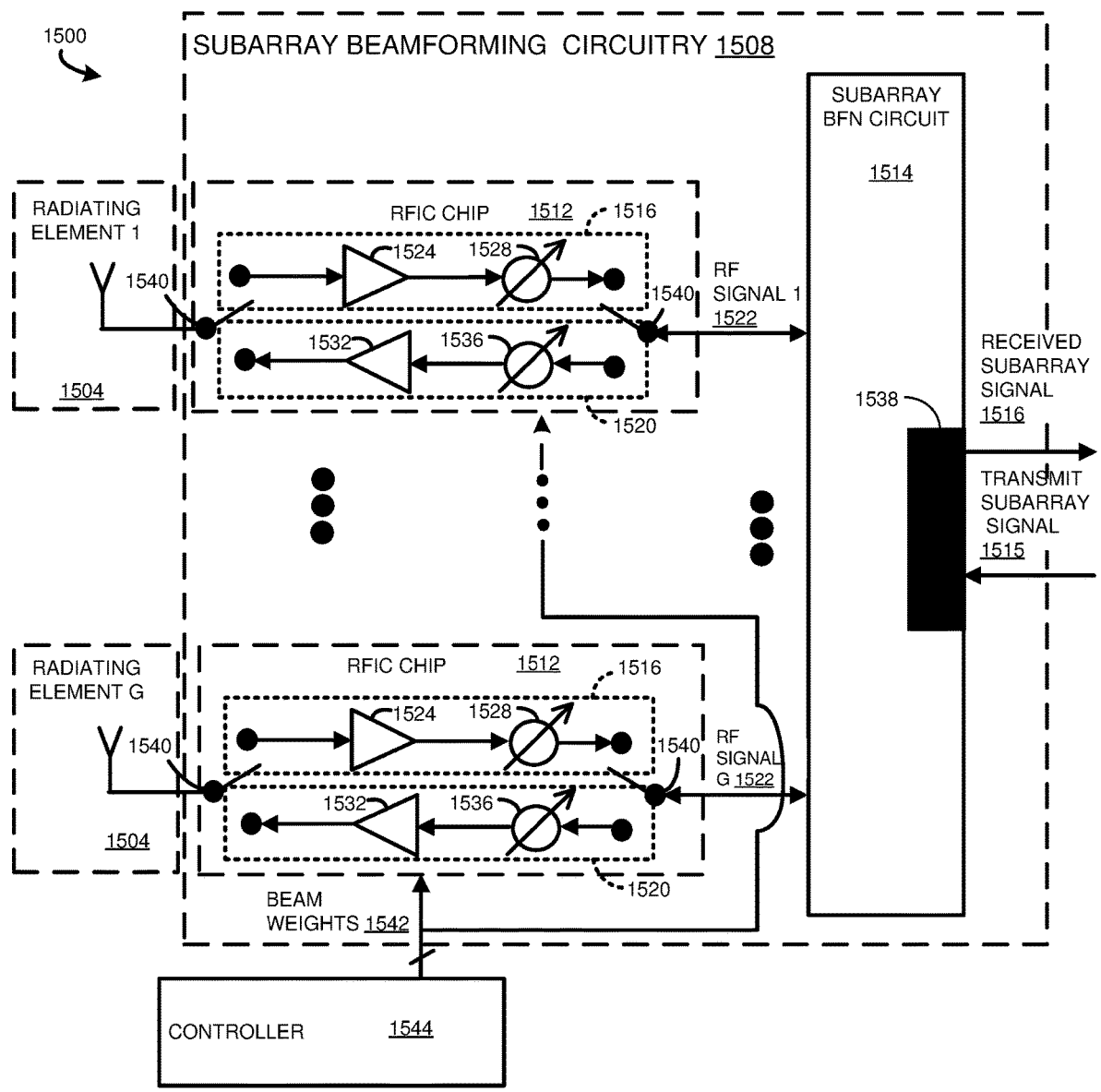
FIG. 15 illustrates an example of a subarray of a phased array antenna operating in half-duplex mode.

FIG. 15 illustrates a block diagram of a subarray 1500 for a phased array antenna that depicts the logical interconnection of one of the J number of subarrays 108 of FIG. 1 and/or the subarray 200 operating in half-duplex mode. The subarray 1500 can be dynamically assigned to a particular beam of a plurality of beams. The beamformer can be implemented with the architecture of the beamformer 112 of FIG. 1, the beamformer 302 of FIG. 3 or the beamformer 402 of FIG. 4. In the illustrated example, G number of radiating elements 1504 communicate with subarray beamforming circuitry 1508. In half-duplex mode, the subarray 1500 switches between a receiving mode and a transmitting mode.

The subarray beamforming circuitry 1508 can include G number of RFIC chips 1512 and a subarray BFN circuit 1514. Each of the G number of RFIC chips 1512 can be coupled to a respective radiating element 1504. In the illustrated example, each RFIC chip 1512 can include a receiving path 1516 and a transmitting path 1520. The receiving path 1516 can include a receiving amplifier 1524 and a receiving phase shifter 1528 for adjusting signals received from a corresponding radiating element 1504. Similarly, the transmitting path 1520 can include a transmitting amplifier 1532 and a transmitting phase shifter 1536 for adjusting a corresponding RF signal 1522 provided from the subarray BFN circuit 1514.

The subarray BFN circuit 1514 can include a port 1538 coupled to the beamformer. The port 1538 of the subarray BFN circuit 1514 can be employed to receive a transmit subarray signal 1515 from the beamformer or to provide a received subarray signal 1516 to the beamformer.

Each RFIC chip 1512 also can include a pair of switches 1540 (e.g., transistor switches) for switching between the receiving mode and the transmitting mode. The RFIC chips 1512 can receive beam weights 1542 from a controller 1544 that can be implemented with the controller 120 of FIG. 1. The beam weights 1542 can control a state of the pair of switches 1540 to switch the subarray 1500 from the receiving mode to the transmitting mode, or vice-versa. Additionally, in some examples, the beam weights 1542 provided from the controller 1544 can control a variable amount of amplitude adjustment applied by each receiving amplifier 1524 and each transmitting amplifier 1532. Thus, in some examples, each receiving amplifier 1524 and each transmitting amplifier 1532 can be implemented as a variable gain amplifier, a switched attenuator circuit, etc. Similarly, in some examples, the beam weights 1542 provided from the controller 1544 can control a variable amount of phase adjustment applied by each receiving phase shifter 1528 and each transmitting phase shifter 1536.

In operation in the receiving mode, the controller 1544 sets the pair of switches 1540 of the RFIC chips 1512 to route signals through the receiving path 1516. Moreover, in the receiving mode an RF signal 1522 received by each of the G number of radiating elements 1504 (or some subset thereof) can be provided to a corresponding RFIC chip 1512 for adjustment. Each receiving amplifier 1524 of the RFIC chips 1512 amplifies the provided signal and each receiving phase shifter 1528 applies a phase shift to output G number of RF signals 1522. The G number of RF signals 1522 can be provided to the subarray BFN circuit 1514. The subarray BFN circuit 1514 can combine the G number of RF signals 1522 to form the received subarray signal 1516 that can be provided to the beamformer for processing.

In operation in the transmitting mode, the controller 1544 sets the pair of switches 1540 to the transmitting path 1520 for transmission of the transmit subarray signal 1515 that can be provided from the beamformer to the subarray BFN circuit 1514. The subarray BFN circuit 1514 divides the transmit subarray signal 1515 into G number of RF signals 1522 that can be provided to the G number of RFIC chips 1512. Each of the G number of RFIC chips 1512 can adjust a corresponding RF signal 1522 based on the beam weights 1542 to generate an adjusted RF signal 1522 that can be provided to a corresponding radiating element 1504. In the example illustrated, the adjusting can include the transmitting phase shifter 1536 phase shifting the RF signal 1522 and the transmitting amplifier 1532 amplifying the RF signal 1522 based on the beam weights 1542. Each radiating element 1504 propagates the corresponding adjusted RF signal 1522 as into free space.

In the half-duplex mode, the subarray 1500 switches between the receiving mode and the transmitting mode. In this manner, the same G number of radiating elements 1504 can be employed for both the transmission and the reception of RF signals 1522.

Figure 16:
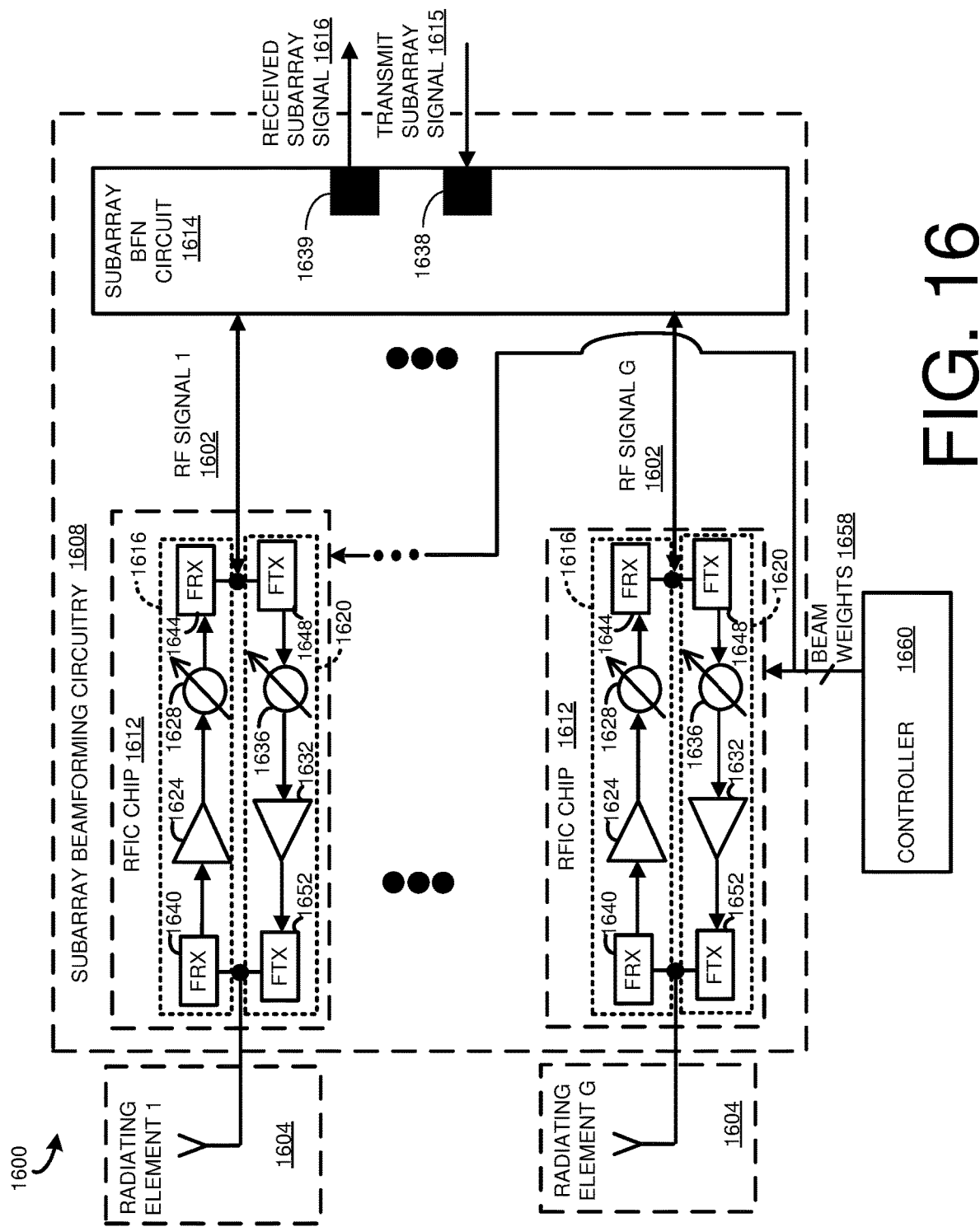
FIG. 16 illustrates an example of a subarray of a phased array antenna operating in frequency division duplex mode.

FIG. 16 illustrates a block diagram of a subarray 1600 for a phased array antenna that depicts the logical interconnection of one of the J number of subarrays 108 of FIG. 1 and/or the subarray 200 operating in frequency division duplex mode. The subarray 1600 can be dynamically assigned to a particular beam of a plurality of beams. The subarray 1600 can communicate with a beamformer that can be implemented with the architecture of the beamformer 112 of FIG. 1, the beamformer 302 of FIG. 3 or the beamformer 402 of FIG. 4. In the illustrated example, G number of radiating elements 1604 communicate with subarray beamforming circuitry 1508. In frequency division duplex mode, the subarray 1600 can include circuitry for processing RF signals 1602 received within a receiving band and for propagating RF signals 1602 in a transmitting band.

The subarray beamforming circuitry 1608 can include G number of RFIC chips 1612 and a subarray BFN circuit 1614. Each of the G number of RFIC chips 1612 can be coupled to a respective radiating element 1604. In the illustrated example, each RFIC chip 1612 can include receive beamforming circuitry along a receiving path 1616 and transmit beamforming circuit along a transmitting path 1620. The receive beamforming circuitry can include a receiving amplifier 1624 and a receiving phase shifter 1628 for adjusting signals received from a corresponding radiating element 1604. Similarly, the transmit beamforming circuitry can include a transmitting amplifier 1632 and a transmitting phase shifter 1636 for adjusting a corresponding RF signal 1602 provided from the subarray BFN circuit 1614.

The subarray BFN circuit 1614 can include a first port 1638 and a second port 1639 that are each coupled to the beamformer. The first port 1638 of the subarray BFN circuit 1614 can be employed to receive a transmit subarray signal 1615 from the beamformer. The second port 1648 can be employed to provide a received subarray signal 1616 to the beamformer.

Additionally, the receiving path 1616 can include an input receiving filter 1640 and an output receiving filter 1644. The input receiving filter 1640 and the output receiving filter 1644 can be implemented as relatively narrow band pass filters that remove signals with frequencies outside the receiving band. Accordingly, the input receiving filter 1640 and the output receiving filter 1644 can have a passband set to the reconceiving band. Similarly, the transmitting path 1620 can include an input transmitting filter 1648 and an output transmitting filter 1652. The input transmitting filter 1648 and the output transmitting filter 1652 can be implemented as relatively narrow band pass filters that remove signals with frequencies outside the transmitting band. Accordingly, the input transmitting filter 1648 and the output transmitting filter 1652 can have a passband set to the transmitting band. In other examples, the output receiving filter 1644 and the output transmitting filter 1652 can be replaced with another component, such as an RF circulator.

The RFIC chips 1612 can receive beam weights 1658 from a controller 1660 that can be implemented with the controller 120 of FIG. 1. The beam weights 1658 can be calculated by the controller based on the particular beam to which the subarray 1600 is assigned. In some examples, the beam weights 1658 control the passband and/or a bandwidth of the input receiving filter 1640 and the output receiving filter 1644. Similarly, in some examples, the beam weights 1658 provided from the controller 1660 control the passband and/or bandwidth of the input transmitting filter 1648 and the output transmitting filter 1652. Additionally or alternatively, the beam weights 1658 provided from the controller 1660 can control a variable amount of amplitude adjustment applied by each receiving amplifier 1624 and each transmitting amplifier 1632. Thus, in some examples, each receiving amplifier 1624 and each transmitting amplifier 1632 can be implemented as a variable gain amplifier, a switched attenuator circuit, etc. Similarly, in some examples, the beam weights 1658 provided from the controller 1660 can control a variable amount of phase adjustment applied by each receiving phase shifter 1628 and each transmitting phase shifter 1636.

In operation, the subarray 1600 can contemporaneously operate in a receiving mode and a transmitting mode based on a frequency of a signal traversing the subarray 1600. More specifically, RF signals 1602 can be received by each of the G number of radiating elements 1604 (or some subset thereof), and these RF signals 1602 can be provided to a corresponding RFIC chip 1612 for adjustment. A signal within the passband (the receiving band) of the input receiving filter 1640 can be adjusted (e.g., amplified and phase shifted) by the receiving path 1616 of a corresponding RFIC chip 1612. The adjusted RF signal 1602 can be filtered by the output receiving filter 1644 and provided as an RF signal 1602 to the subarray BFN circuit 1614. In this manner, the subarray BFN circuit 1614 receives G number of RF signals 1602 from the G number of RFIC chips 1612, wherein each of the received G number of RF signals 1602 are within the receiving band. The subarray BFN circuit 1614 can combine the received G number of RF signals 1602 to form a received subarray signal 1616 that can be provided to the beamformer for further processing through the second port 1639.

Additionally, contemporaneously with the receiving of the RF signals, a transmit subarray signal 1615 can be provided from the beamformer to the subarray BFN circuit 1614 at the second port 1638. The subarray BFN circuit 1614 divides the transmit subarray signal 1615 into G number of RF signals 1602 that can be provided to the G number of RFIC chips 1612. The input transmitting filter 1648 of each of the G number RFIC chip 1612 removes signals outside of the passband (the transmitting band). Additionally, the transmitting path 1620 can adjust (phase shift and amplify) a corresponding RF signal 1602 to generate an adjusted RF signal 1602 that can be provided through the output transmitting filter 1652 and to a corresponding radiating element 1604. Each radiating element 1604 propagates the corresponding adjusted RF into free space.

In the subarray 1600, the frequency of traversing signals controls the routing of signals through the subarray 1600. In this manner, the same radiating elements 1604 can be employed for both the transmission and the reception of RF signals 1602. In other examples, different radiating elements 1604 may be used for transmission and reception, such that the subarray includes a first set of radiating elements 1604 for transmission and a second (different) set of radiating elements for reception. The two sets of radiating elements may for example be overlayed within each subarray 1600, such that the radiating elements 1604 used for transmission are within a first region that at least partially overlaps with a second region that contains the radiating elements 1604 used for reception. Additionally, in some examples, the subarray 1600 can have an architecture that intermittently switches between the transmitting mode and the receiving mode to provide half-duplexing.

Figure 17:
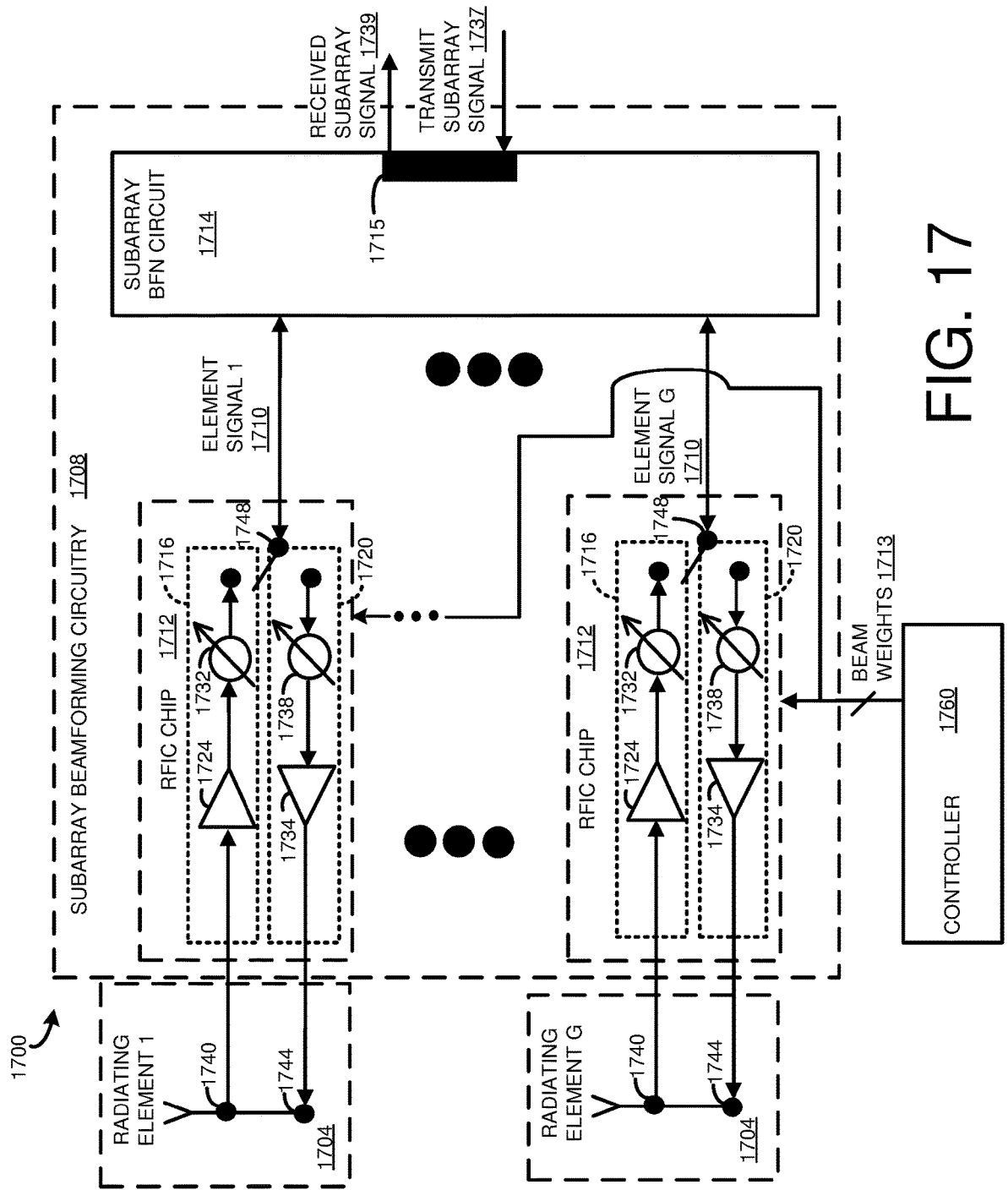
FIG. 17 illustrates an example of a subarray of a phased array antenna operating in polarization duplex mode.

FIG. 17 illustrates a block diagram of a subarray 1700 for a phased array antenna that depicts the logical interconnection of one of the J number of subarrays 108 of FIG. 1 and/or the subarray 200 operating in polarization duplex mode, which can be a particular configuration of half-duplex mode. The subarray 1700 can be dynamically assigned to a particular beam of a plurality of beams. The subarray 1700 can communicate with a beamformer that can be implemented with the architecture of the beamformer 112 of FIG. 1, the beamformer 302 of FIG. 3 or the beamformer 402 of FIG. 4. In the illustrated example, G number of radiating elements 1704 communicate with subarray beamforming circuitry 1708. In polarization duplex mode, the subarray beamforming circuitry 1708 can include circuitry for processing RF signals 1710 received with a first polarization and for propagating RF signals 1710 in a second polarization, orthogonal to the first polarization.

The subarray beamforming circuitry 1708 can include G number of RFIC chips 1712 and a subarray BFN circuit 1714. Each of the G number of RFIC chips 1712 can be coupled to a respective radiating element 1704. In the illustrated example, each RFIC chip 1712 can include a receiving path 1716 and a transmitting path 1720. The receiving path 1716 can include a receiving amplifier 1724 and a receiving phase shifter 1732 for adjusting RF signals 1710 received from a corresponding radiating element 1704. Similarly, the transmitting path 1720 can include a transmitting amplifier 1734 and a transmitting phase shifter 1738 for adjusting a corresponding RF signal 1710 provided from a subarray BFN circuit 1714.

The subarray BFN circuit 1714 can include a port 1715 coupled to the beamformer. The port 1715 of the subarray BFN circuit 1714 can be employed to receive a transmit subarray signal 1737 from the beamformer or transmit a received subarray signal 1739 to the beamformer.

The receiving path 1716 can be coupled to a first port 1740 of the radiating element 1704 and the transmitting path 1720 can be coupled to a second port 1744 of the radiating element 1704. The first port 1740 of the radiating element 1704 can be configured to output RF signals 1710 received at the radiating element 1704 that are in a first polarization, and the second port 1744 of the radiating element 1704 can be configured to transmit signals received at the radiating element 1704 with a second polarization, orthogonal to the first polarization. For instance, the first polarization can be vertical polarization and the second polarization can be horizontal polarization, or vice versa. Alternatively, the first polarization can be right hand circular polarization (RHCP) and the second polarization can be left hand circular polarization (LHCP) or vice versa.

Each RFIC chip 1712 also can include a switch 1748 (e.g., a transistor switch) for switching between the receiving mode and the transmitting mode. The RFIC chips 1712 can receive beam weights 1713 from a controller 1760 that can be implemented with the controller 120 of FIG. 1. The beam weights 1713 can be calculated by the controller 1760 based on a beam to which the subarray 1700 is assigned. The beam weights 1713 can control a state of the switches 1748 to switch the subarray 1700 from the receiving mode to the transmitting mode, or vice-versa. Additionally, in some examples, the beam weights 1713 provided from the controller 1760 can control a variable amount of amplitude adjustment applied by each receiving amplifier 1724 and each transmitting amplifier 1734. Thus, in some examples, each receiving amplifier 1724 and each transmitting amplifier 1734 can be implemented as a variable gain amplifier, a switched attenuator circuit, etc. Similarly, in some examples, the beam weights 1713 provided from the controller 1760 can control a variable amount of phase adjustment applied by each receiving phase shifter 1732 and each transmitting phase shifter 1738.

In operation in the receiving mode, the controller 1760 sets the switches 1748 of the RFIC chips 1712 to route signals through the receiving path 1716. Moreover, in the receiving mode, an RF signal 1710 in the first polarization duplex mode received by each of the G number of radiating elements 1704 (or some subset thereof) can be provided to a corresponding RFIC chip 1712 for adjustment. Each receiving amplifier 1724 of the RFIC chips 1712 can amplify the provided signal and each receiving phase shifter 1732 can apply a phase shift to output G number of RF signals 1710. The G number of RF signals 1710 can be provided to the subarray BFN circuit 1714. The subarray BFN circuit 1714 can combine the G number of RF signals 1710 to form a received subarray that can be provided to the beamformer for processing.

In operation in the transmitting mode, the controller 1760 sets the switches 1748 to the transmitting path 1720 to transmit a transmit beam signal 1737 that can be provided from the local system to the subarray BFN circuit 1714. The subarray BFN circuit 1714 divides the transmit beam signal 1737 into G number of RF signals 1710 that can be provided to the G number of RFIC chips 1712. Each of the G number of RFIC chips 1712 can adjust a corresponding RF signal 1710 to provide an adjusted RF signal 1710 to a corresponding radiating element 1704. In the example illustrated, the adjusting can include the transmitting phase shifter 1738 phase shifting the RF signal 1710 and the transmitting amplifier 1734 amplifying the RF signal 1710 based on the beam weights 1713. Each radiating element 1704 propagates the corresponding adjusted RF signal 1710 into free space.

In the polarization duplex mode, the subarray 1700 switches between the receiving mode and the transmitting mode. However, by leveraging the orthogonal relationship of signals at the first port 1740 and signals at the second port 1744 of the G number of radiating elements 1704, each RFIC chip 1712 can be implemented with a single switch 1748 to curtail signal loss. Additionally, in this manner, the same radiating elements 1704 can be employed for both the transmission and the reception of RF signals 1710.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A multi-beam phased array antenna system comprising:
    a beamformer responsive to control signals to convert between a plurality of subarray signals and a plurality of beam signals;
    a plurality of subarrays to communicate a plurality of beams corresponding to the plurality of beam signals, wherein each subarray of the plurality of subarrays comprises:
       a plurality of radiating elements; and
       subarray beamforming circuitry responsive to respective beam weights to adjust RF signals communicated with the plurality of radiating elements, and convert between the adjusted RF signals and one respective subarray signal of the plurality of subarray signals, wherein the respective subarray signal corresponds to one particular beam of the plurality of beams; and
    a controller configured to:
       determine two or more beams of the plurality of beams, wherein the two or more beams are the same communication type;
       assign disjoint subsets of subarrays of the plurality of subarrays to each of the determined two or more beams such that each subarray of the plurality of subarrays is assigned to only the one particular beam of the plurality of beams;
       provide the respective beam weights for each of the plurality of subarrays based on the assigning; and
       provide the control signals to the beamformer based on the assigning.

2. The multi-beam phased array antenna system of claim 1, wherein the subarray beamforming circuitry of each of the plurality of subarrays further comprises:
    a set of radio frequency integrated circuit chips coupled to the plurality of radiating elements and each RFIC chip of the set of RFIC chips, responsive to the beam weights provided from the controller, applies the calculated beam weights to the RF signals.

3. The multi-beam phased array antenna system of claim 1, wherein the subarray beamforming circuitry of each of the plurality of subarrays comprises amplifiers and phase shifters responsive to the beam weights provided by the controller to amplify and phase shift the RF signals communicated with the plurality of radiating elements.

4. The multi-beam phased array antenna system of claim 1, wherein the subarray beamforming circuitry of each of the plurality of subarrays further comprises:
    a subarray beam forming network (BFN) comprises signal paths that provide the conversion between the respective subarray signal and the RF signals.

5. The multi-beam phased array antenna system of claim 1, wherein the controller is further configured to assign a first subset of the disjoint subsets of subarrays to a first determined beam of the two or more determined beams and assign a second subset of the disjoint subsets of subarrays to a second determined beam of the two or more beams, wherein at least one of a direction, frequency, and polarization of the first beam is different than a direction, frequency, and polarization of the second beam.

6. The multi-beam phased array antenna system of claim 1, wherein the determined two or more beams comprises at least four determined beams, the system further comprising:
    a transmit antenna comprising a first subset of subarrays and a second subset of subarrays of the disjoint subsets of subarrays; and
    a receive antenna comprising a third subset of subarrays and a fourth subset of subarrays of the disjoint subsets of the subarrays;
    wherein the controller is further configured to assign the first subset of subarrays to transmit a first beam of the at least four determined beams, assigns the second subset of subarrays to transmit a second beam of the at least four determined beams, assign the third subset of subarrays to receive a third beam of the at least four determined beams, and assign the fourth subset of subarrays to receive a fourth beam of the at least four determined beams.

7. The multi-beam phased array antenna system of claim 6, wherein the transmit antenna and the receive antenna are spaced apart.

8. The multi-beam phased array antenna system of claim 6, wherein the transmit antenna at least partially overlays the receive antenna.

9. The multi-beam phased array antenna system of claim 1, wherein first and second subarrays of the plurality of subarrays have a first shape.

10. The multi-beam phased array antenna system of claim 9, wherein a third subarray of the plurality of subarrays has a second shape different than the first shape.

11. The multi-beam phased array antenna system of claim 1, wherein the plurality of subarrays are arranged in regular lattice.

12. The multi-beam phased array antenna system of claim 1, wherein the plurality of subarrays are arranged in an irregular pattern.

13. The multi-beam phased array antenna system of claim 1, wherein the beamformer further comprises:
   a plurality of beamforming networks (BFNs), wherein each of the plurality of BFNs is associated with only one beam of the plurality of beams; and
   a plurality of switches, wherein each switch is coupled to a given subarray of the plurality of subarrays and a given BFN of the plurality of BFNs and a state of each of the plurality of switches is responsive to the control signals from the controller.

14. The multi-beam phased array antenna system of claim 13, wherein the plurality of switches responsive to the control signals from the controller couple each subarray in a first subset of subarrays of the disjoint subsets of subarrays to a first BFN of the plurality of BFNs associated with a first beam and couple each subarray in a second subset of subarrays of the disjoint subsets of subarrays to a second BFN of the plurality of BFNs associated with a second beam.

15. The multi-beam phased array antenna system of claim 14, wherein the first BFN responsive to the control signals from the controller applies beam weights to the subarray signals associated with the first subset of subarrays and the second BFN responsive to the control signals from the controller applies beam weights to the subarray signals associated with the second subset of subarrays.

16. The multi-beam phased array antenna system of claim 1, wherein the beamformer further comprises:
   digital logic responsive to the control signals from the controller to form each beam in the plurality of beams, wherein the digital logic is coupled to each of the plurality of subarrays and the digital logic responsive to the control signals from the controller is configured to associate a first set of subarray signals with a first beam of the determined two or more beams of the plurality of beams and associate a second subset of subarray signals with a second beam of the determined two or more beams of the plurality of beams.

17. The multi-beam phased array antenna system of claim 16, wherein the beamformer further comprises a set of analog to digital converters (ADCs) coupled between the digital logic and each of the plurality of subarrays, wherein each ADC in the set of ADCs communicate a respective subarray signal with each of the plurality of subarrays.

18. The multi-beam phased array antenna system of claim 1, further comprising:
   a set of modems, wherein each modem of the set of modems is coupled to the beamformer and each modem is configured to communicate data encoded on a respective one of the plurality of beam signals with the beamformer.

19. The multi-beam phased array antenna system of claim 1, wherein each of the plurality of subarrays has a top surface with a regular tile shape.

20. The multi-beam phased array antenna system of claim 1, wherein each respective subarray signal of the plurality of subarray signals corresponds to only one particular beam of the plurality of beams.

21. The multi-beam phased array antenna system of claim 1, wherein the subarray beamforming circuitry of each subarray of the plurality of subarrays responsive to the beam weights provided by the controller is configured to convert between respective adjusted RF signals and only one respective subarray signal of a first communication type.

22. The multi-beam phased array antenna system of claim 21, wherein the subarray beamforming circuitry of each subarray of the plurality of subarrays comprises a subarray signal port for communicating the one respective subarray signal of the plurality of subarray signals.

23. The multi-beam phased array antenna system of claim 22, wherein the subarray beamforming circuitry of each subarray has only one subarray signal port.

24. The multi-beam phased array antenna system of claim 22, wherein the subarray beamforming circuitry of each subarray of the plurality of subarrays is further configured to convert between respective adjusted RF signals and only one respective subarray signal of a second communication type, and comprises a second subarray signal port for communicating the one respective subarray signal of the second communication type.

25. The multi-beam phased array antenna system of claim 1, the beamformer further comprises a plurality of interconnected beam conversion circuits, wherein each beam conversion circuit is coupled to a respective subarray of the plurality of subarrays.

26. The multi-beam phased array antenna system of claim 1, wherein the two or more beams are transmit beams.

27. The multi-beam phased array antenna system of claim 1, wherein the two or more beams are receive beams.

28. The multi-beam phased array antenna system of claim 1, wherein the subarray beamforming circuitry of each subarray of the plurality of subarrays is receive subarray beamforming circuitry, and each subarray of the plurality of subarrays further comprises:
   transmit subarray beamforming circuitry responsive to respective beam weights to adjust RF signals communicated with the plurality of radiating elements, and convert one respective subarray signal of the plurality of subarray signals into the adjusted RF signals, wherein the respective subarray signal corresponds to a particular transmit beam of the plurality of beams;
   wherein the controller is further configured to:
      determine two or more transmit beams of the plurality of beams; and
      assign disjoint subsets of subarrays of the plurality of subarrays to each of the determined two or more transmit beams.

* * * * *